(12) United States Patent
Ketonen et al.

(10) Patent No.: US 7,035,828 B2
(45) Date of Patent: Apr. 25, 2006

(54) METHOD AND SYSTEM FOR MODIFYING AND TRANSMITTING DATA BETWEEN A PORTABLE COMPUTER AND A NETWORK

(75) Inventors: Jussi Ketonen, Palo Alto, CA (US); Carolyn Talcott, Stanford, CA (US)

(73) Assignee: TopMoxie, Inc., Palo Alto, CA (US)

( * ) Notice: Subject to any disclaimer, the term of this patent is extended or adjusted under 35 U.S.C. 154(b) by 569 days.

(21) Appl. No.: 10/082,495

(22) Filed: Feb. 22, 2002

(65) Prior Publication Data

US 2002/0107807 A1    Aug. 8, 2002

Related U.S. Application Data

(63) Continuation-in-part of application No. 09/696,558, filed on Oct. 25, 2000.

(60) Provisional application No. 60/271,170, filed on Feb. 23, 2001.

(51) Int. Cl.
*G06T 17/60* (2006.01)

(52) U.S. Cl. .................. 705/51; 705/1; 707/104.1; 707/203; 704/8

(58) Field of Classification Search .............. 705/51, 705/1; 707/104.1, 203; 704/8
See application file for complete search history.

(56) References Cited

U.S. PATENT DOCUMENTS 5,857,201 A * 1/1999 Wright et al. ............ 707/104.1
6,182,142 B1 * 1/2001 Win et al. .................... 709/229
6,324,542 B1 * 11/2001 Wright et al. ............ 707/104.1

FOREIGN PATENT DOCUMENTS

JP    2002366733    * 12/2002

OTHER PUBLICATIONS

Creating a policy-aware web: discretionary, rule based access for the world wide web. (Date unknown), Weitzner, Daniel, J.*

* cited by examiner

*Primary Examiner*—James P. Trammell
*Assistant Examiner*—John M. Winter
(74) *Attorney, Agent, or Firm*—Dergosits & Noah LLP

(57) ABSTRACT

A system for assisting a mobile client interact with associated computers includes a mobile device, a broker, a mini-server and a personal agent. The mobile device transmits requests which include identification information and security information. The requests are transmitted to the mini-server either directly or through the broker. The requests may also be transmitted to the personal agent. Public and restricted requests are transmitted to the mini-server which responds to the requests by providing information accessible through the internet. Private requests are transmitted to the personal agent. Secure connections between the mobile device, broker, mini-server and personal agent are used if required by the security level of the request. The mini-server or personal agent obtains the requested information and formats the requested information according to the requirements of the mobile client identification. The requested information is transmitted to the mobile client in a format which accounts for the visual display limitations of the mobile client.

8 Claims, 23 Drawing Sheets

Figure 4c

METHOD AND SYSTEM FOR MODIFYING AND TRANSMITTING DATA BETWEEN A PORTABLE COMPUTER AND A NETWORK

This application is a continuation in part of co-pending U.S. patent application Ser. No. 09/696,558 filed Oct. 25, 2000 titled "Autonomous local assistant for managing business processes" which is also hereby incorporated by reference. This application also claims the benefit of U.S. Provisional application No. 60/271,170 filed Feb. 23, 2001 titled "Method and system for modifying and transmitting data between a portable computer and a network" by Jussi Ketonen and Carolyn Talcott.

BACKGROUND

Personal digital assistants (PDA) are mobile devices which typically include an input device, a visual display, a memory and a microprocessor. PDAs may provide information and perform limited tasks for the user. A PDA typically works together with another computer by sharing and "synchronizing" data such as contacts lists and schedule information. In order to share data, the PDA may need a wired connection to be connected to the computer.

Some PDAs are capable of obtaining information directly from the internet. Information on the internet is typically obtained using the HTTP protocol and includes HTML documents. In order to access a web site, a computer specifies a URL (Uniform Resource Locator) which is a unique address associated with a specific file published on the Internet. The HTML documents associated with the URL contain information that is generally formatted for displays in image on a full sized monitor. Because PDAs typically have smaller visual displays and limited amounts of memory they may not be capable of displaying entire HTML documents as they were intended to be displayed.

SUMMARY OF THE INVENTION

The inventive mobile assistant system includes hardware and software which facilitate communications between mobile clients (PDAs) and the internet or an associated personal agent (desktop computer). Users can submit requests through their mobile client to the mobile assistant system which responds by obtaining the requested information or performing the requested task. The mobile assistant system recognizes the type of PDA being used and can modify the information transmitted to the mobile client so that it will be properly displayed visual display of the PDA. The mobile assistant also allows a user to interact securely and remotely with applications on his or her desktop computer to carry out tasks such as: banking, accounting, bidding in auctions, stock trading, etc.

In an embodiment, the mobile assistant system includes one or more mobile clients, a personal agent, a broker and a mini-server, each of which is a computer running the local assistant program. The mobile client transmits requests, which may be for information, data, program downloads, reminders or spidering (to summarize job opportunities), to either the broker or the mini-server. The broker acts like a message center receiving requests from the mobile client and forwarding them to the appropriate source of information. The request includes information identifying the mobile client as well as special security data, if confidential information is being requested.

The mobile assistant system operates over a range of security levels. The requests may also indicate a security level such as public, restricted or private. Information that is freely accessible over the internet is "public." Public requests may not require any user identification, authentication or a secure communications connection. Restricted information may be information which is available from a public website but which has restricted access, such as financial or brokerage account access and other confidential information. Restricted requests may require user identification, authentication and a secure communications connection. Private information may be information stored on the personal agent computer which is only accessible to the user. Private requests require user identification, authentication and a secure communications connection.

The broker determines the security level of the request and proceeds accordingly. In the case of a public level requests, the broker opens a non-secure to the mini-server and in the case of a restricted level request the broker opens a secure communications connection to the mini-server. The broker associates this connection to the client request connection, and forwards the request to the mini-server. When the mini-server receives the request, it responds by retrieving the requested information. The mini-server then extracts any information contained in the request about the mobile client device characteristics, and formats the requested information accordingly. The requested information, suitably formatted, is transmitted back to the broker. The broker then forwards this information to the mobile client on the associated mobile-client connection, completing the transaction. Because the requested information has been formatted to the PDA requirements, the required information can be fully viewed on the PDA display. The broker may be accessed through an internet URL and a single broker may support many mobile clients.

In the case of a private request the broker generates a new ticket stores the request together with this ticket in its private request database for later retrieval by a personal agent. The broker then transmits the ticket to the mobile-client in a form that can be used to access the requested information once it becomes available.

Periodically the personal agent of a mobile client will open a connection to the broker and ask for pending requests from the mobile client. The personal agent provides identification and authentication information. The broker searches its database of private requests for requests directed to the personal agent, that have no associated reply, and that have authentication data matching that provided by the personal agent. If any are found, one such is transmitted to the personal agent along with its ticket. Otherwise a 'no pending requests' message is transmitted to the personal agent. In either case the broker response ends the get-request transaction.

The personal agent, upon retrieving a ticketed request from the broker carries out the request. This may involve gathering information, or executing some task. The personal agent formulates a reply and formats it according the device characteristics of the mobile client The personal agent then opens a secure connection to the broker and posts the reply together with the request ticket. The broker stores the reply along with the ticket in the private request database.

When the mobile client submits a retrieval request, the broker searches the private request database for an item matching the ticket information of the request for which a reply has been posted. If there is a match, the broker transmits the requested information associated with the matching ticket. If the broker cannot find a matching ticket, a status message stating that the requested information is not yet available is transmitted to the mobile client or personal agent.

In an embodiment, public requests can be transmitted directly from a mobile client to the mini-server without transmitting information through the broker. Again the request includes information identifying the PDA. If information is requested, the mini-server can retrieve the requested information and format the information according to the mobile client requirements. The mini-server responds by transmitting the requested information back to the mobile client. Because public information is being requested a secure communication connection may not be required.

The personal agent, broker and mini-server all have a local assistant client side computer program which is used to monitor communications activity, determine applicable rules, interpret the rules, manage a local interaction database (IDB) and manage a local ruleset database (RDB). Rules are syntactic descriptions of conditions for selection and actions to be taken relative to a supplied information context. The ruleset is a collection of rules, data and/or meta-data which work together to implement local assistant functionality.

In an embodiment, a local assistant administrative server is also a component of the mobile assistant system. The local assistant administrative server is a source of current information for the mobile assistant system. Upgrades and other utility information can be transmitted from the local assistant administrative server to the other mobile assistant system components. The local assistant administrative server can communicate with the local agents, brokers and mini-servers so that upgrades to the rules and new features may be easily loaded.

BRIEF DESCRIPTION OF THE DRAWINGS

The invention is herein described, by way of example only, with reference to embodiments of the present invention illustrated in the accompanying drawings, wherein:

FIG. 4c is a screen shot illustrating the listener assistant application;

DETAILED DESCRIPTION

Figure 1:
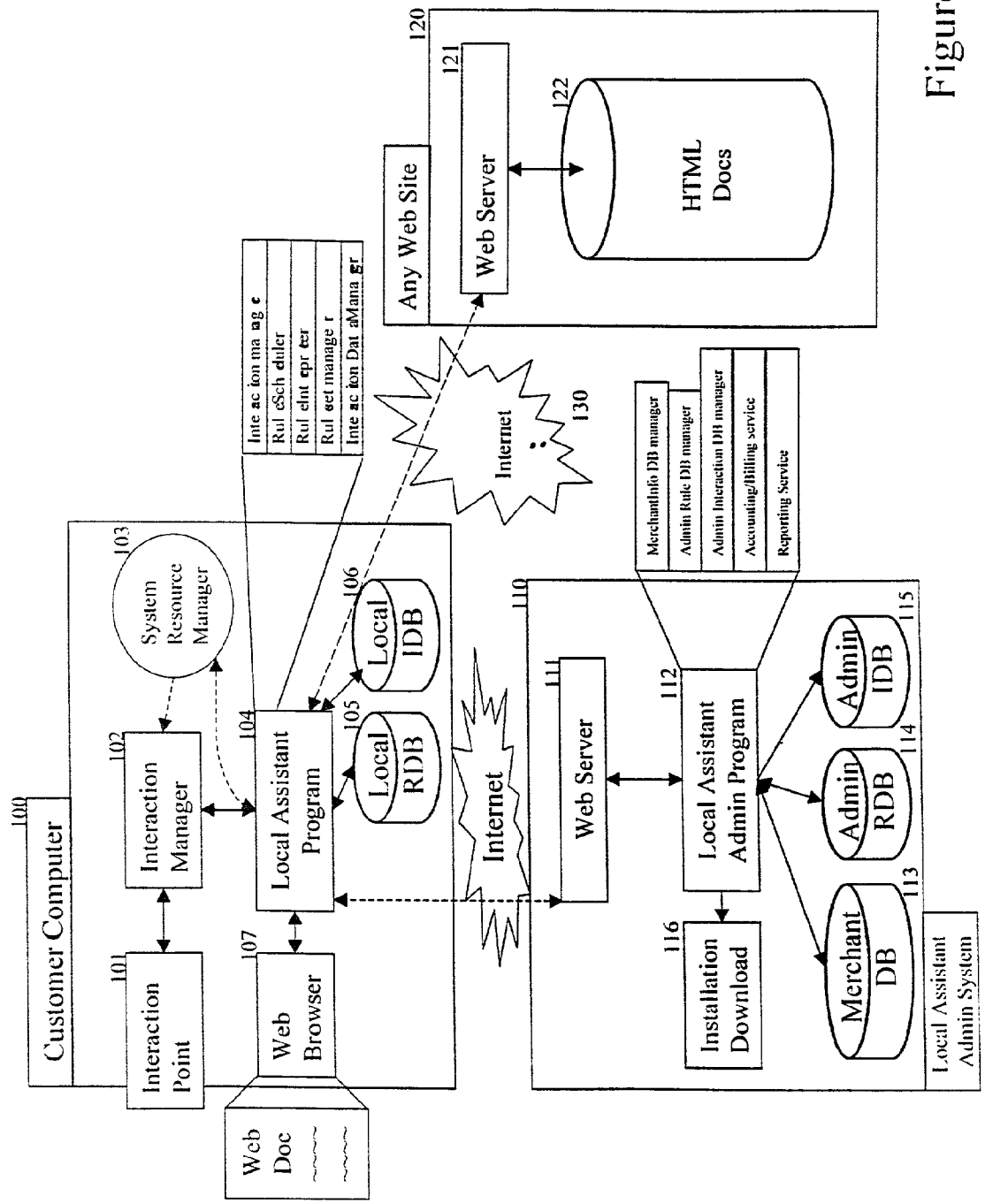
FIG. 1 is a diagram of the local assistant system.

The inventive system is a mobile assistant system which improves upon the "Local assistant For Managing Business Processes" system described in the copending U.S. patent application Ser. No. 09/696,558. The Mobile assistant (MA) system builds upon the local assistant technology by incorporating mobile clients which may communicate with the rest of the Mobile assistant System.

The following is a detailed description of the presently preferred embodiments of the present invention. However, the present invention is in no way intended to be limited to the embodiments discussed below or shown in the drawings. Rather, the description and the drawings are merely illustrative of the presently preferred embodiments of the invention.

A. The Local Assistant System

The local assistant (LA) is a client-side software system, that enables an internet agent to provide highly efficient and flexible relevance-based information dissemination services to assist merchants and other internet based entities, to bring timely and relevant offers of products and other information to online users. The client side software is extensible and customizable by "rules" that are downloadable. Each service/application of the system is implemented by a rule-set (called a feature) consisting of rules and supporting meta-data.

FIG. 1 illustrates the local assistant system architecture which configured to support the LA. The local assistant system consists of one or more customer computers 100 in communication with the internet 130 and an local assistant administrative system 110. The customer computer 100 include a local assistant kernel 104 interacts with a rule database 105 and an interaction database 106. The local assistant program 104 is also in communication with the local assistant administrative system 110. The local assistant administrative system 110 includes a web server 111 and a local assistant administrative program 112 which interacts with a merchant data base 113, an administrative ruleset database 114 and an administrative interaction database 115.

The local assistant system includes a customer computer 100 running a local assistant client-side computer program 104, a local assistant administrative system 110 operating in the context of other web sites (represented in FIG. 1 by Any web Site 120), all of which are linked together by the internet 130 (which is left implicit in the remaining figures of this document). The customer computer 100 can be any type of computing device that allows a customer interactively browse web sites via a web browser 107 and, preferably, to control other devices such as media players, location sensors, etc., represented in FIG. 1 by an interaction point 101 (such as a CD player) and an interaction manager 102 (such as Win Amp). (Note that the web browser 107 itself is an example of an interaction manger 102, the interaction point 101 being a mouse/keyboard/pointing device.) For example, the customer computer 100 could be a personal computer (PC) connected to the Internet via a modem, or a hand-held or wearable computer connected to the Internet by wireless communication.

The local assistant client-side computer program 104, written in Java in the case of the Top Moxie implementation, includes several functions: monitoring client interaction activity, determining applicable rules, interpreting rules, managing its local interaction data database (IDB), and managing its local ruleset database (RDB).

The local assistant program 104 interacts with the system resource manager 103 to determine current client activity such as open browser windows or running CD players. For each activity of interest, the local assistant program 104 constructs an information context from data obtained from the interaction manager 102. This information could be as simple as the mane of performing artist, or as complicated as the HTML text of a web document. This information context extends the information context implicit in the local interaction data database (Local IDB) 106. The local assistant program 104 then queries the local ruleset database (Local RDB) 105 for applicable rules and schedules an executes the rules using a simple, conventional scheduling algorithm to order multiple execution tasks. The rule interpreter functionality determines actions to take based on the rule and information context that it is given. Possible actions include: invoking other rules, retrieving HTML documents 122 from a web server 121 and analyzing them to extract relevant data, requesting operations on the interaction data database 106, requesting operations on the ruleset database 105, posting updates to the local assistant Administrative site 110, and presenting information to an interacting with the customer. The interaction data manger functionality provides access to the local interaction database 106 and manages creation, lookup, update and deletions of named data elements. The ruleset manager provides functionality to query the local ruleset database 105 for rules applicable in a given context: to suspend, resume or delete a ruleset: and to download new rulesets and ruleset updates from the local assistant Administrative site 110.

The local assistant system presents information to the customer using the web Browser 107 to display HTML formatted information. One kind of information presented is offers in the form of hyperlinks. Other forms of interaction provided by HTML are also possible.

The local assistant Admin System 110 is a site that provides functionality to download the local assistant client-side application 116, to update the client-side rulesets, to manage merchant database 113, admin ruleset database 114, an admin interaction database 115, and to upload interaction data summaries generated by rules execution on client machines.

In the local assistant preferred embodiment discussed herein, the rules and supporting meta-data are represented a XML text and stored, encoded, in files. The XML encoding takes placed as follows: first, the XML files is compressed using the standard zip algorithm available in Java 1.1. Second, the bits are scrambled to make the resulting binary stream harder to decode. Secure Internet interaction between the local assistant web server 111, a client-side browser 107 and a local assistant program 104 is accomplished by use of this encoding technique with the HTTPS secure socket layer protocol and signed certificates. This assures the customer that the local assistant software has the prescribed behavior and assures the assisted merchants that the rulesets designed for them are those that are executed by the Local assistant.

The merchant database (Merchant DB) 113 contains information about each assisted merchant including: username/id, password, email, physical mail and telephone number, where the username/id is a unique identifier assigned by the Agent (e.g. Top Moxie, Inc.) to the assisted merchant.

The administrative ruleset database (Admin RDB) 114 contains rulesets currently available for download. A ruleset in this database could be one designed for a particular assisted merchant, or a ruleset designed simply to benefit the customer (for example, customization or local data management), making the use of the local assistant more appealing and widespread. The local assistant server-side ruleset manager provides functionality (to agent administrators) to add new rulesets, and to delete obsolete rulesets, and to define updates to maintain existing rulesets. It also provides functionality to download updates and new rulesets upon request, to keep download statistics and to control the number to allowed downloads for a given ruleset. For each ruleset, the following information is kept; name/id, date, merchant, file location (of the actual ruleset): maximum number, maximum number active, total number, number active; and start and end date.

The administrative interaction database (admin IDB) 115 contains anonymous interaction information uploaded from customer computers as a result of execution of rules that specify such actions. The protocol used for uploading by the Top Moxie preferred embodiment is the HTTP POST method, passing a list represents as strings. The database schema is restricted to accept only limited information, thus preserving customer privacy.

The local assistant installation download 116 is a file with executable code that will install the local assistant client-side program once the customer has confirmed the download request and the customer computer 100 has authenticated the connection. The local assistant client-side application can be downloaded from the local assistant administrative system web site, or by using special links embedded in a web document served by an assisted merchant, or other web site.

The any web site component 120 represents information available as HTML documents 122 and delivered upon request by the web server 121. Some documents may contain links for downloading the local assistant program. If a download link is contained in a document on an assisted merchant's site, then downloading the system will result in also downloading rulesets associated with that assisted merchant. Documents on other web sites may be targets for analysis by local assistant rulesets. For example, pages from booksellers sites can be analyzed for title, author, price ISBN and other information.

The local assistant system is virtually risk free because it doesn't require ANY modifications to the assisted merchant web site for e-commerce software. All of the promotions are executed in compact downloads in the customer's browser. No data need be transmitted directly back to the assisted merchant site.

Using the local assistant program, the assisted merchant can present special offers, tailored precisely to the interest of a target customer, at exactly the moment the customer is looking for products like the assisted merchant's products. In one scenario, an assisted merchant can present a price quote for a book every time the customer asks for a quote from another book vendor. In another scenario, a merchant whose role is intermediary for loyalty program can present an offer to a customer to purchase via one or more loyalty program merchants when the customer is shopping for products offered by these merchants. In yet another scenario, assisted merchant can present a list of available CDs by an artist that the customer is currently listening to.

The local assistant architecture is completely data-driven. The local assistant client-side system itself is built from a very small runtime core using the same type of XML rules, data and meta-data that is available to anyone else.

In other words, any application, such as the web assistant, the loyalty program assistant, the listener assistant, or the Customizer, is built from the core engine by the addition of a "knowledge base" of data, meta-data and rules expressed XML, along with user interface components.

When operating in conjunction with the browser, the user interface components are themselves expressed as data in HTML. Thus, the core engine provides a highly extensible platform for delivering new applications and functionality, with minimal maintenance headaches and no required installation.

Because the system is built using itself, the core engine is automatically exercised in a very extensive manner during standard system operations, guaranteeing a high degree of code path coverage. Since no new code need be written, the emphasis can be on the testing and understanding of the knowledge embodied in the underlying XML rules.

3. Download of Local Assistant by Customer

Figure 2A:
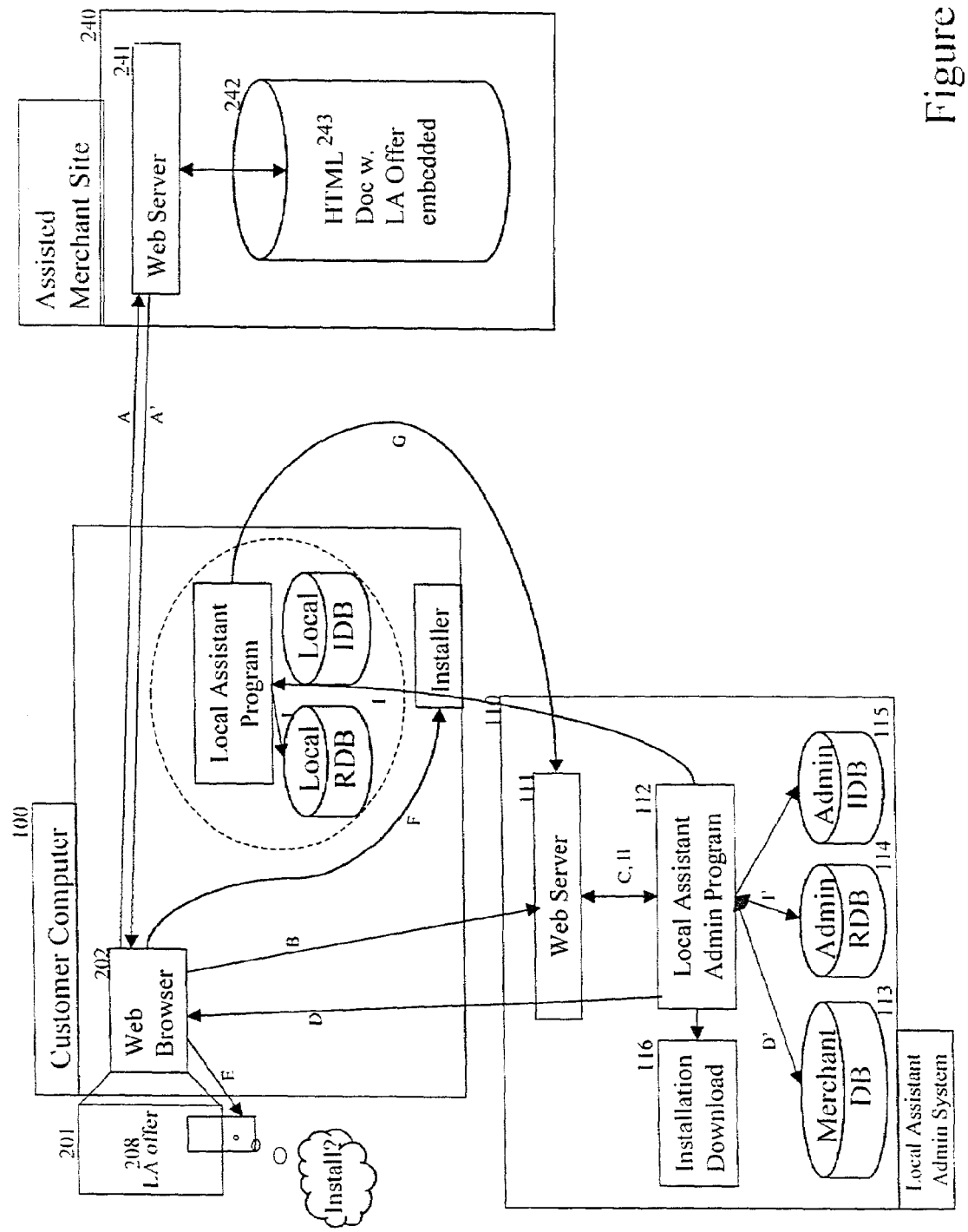
FIG. 2a is a diagram of the local assistant system including information flow paths for a customer download of the client-side local assistant core.
Figure 2B:
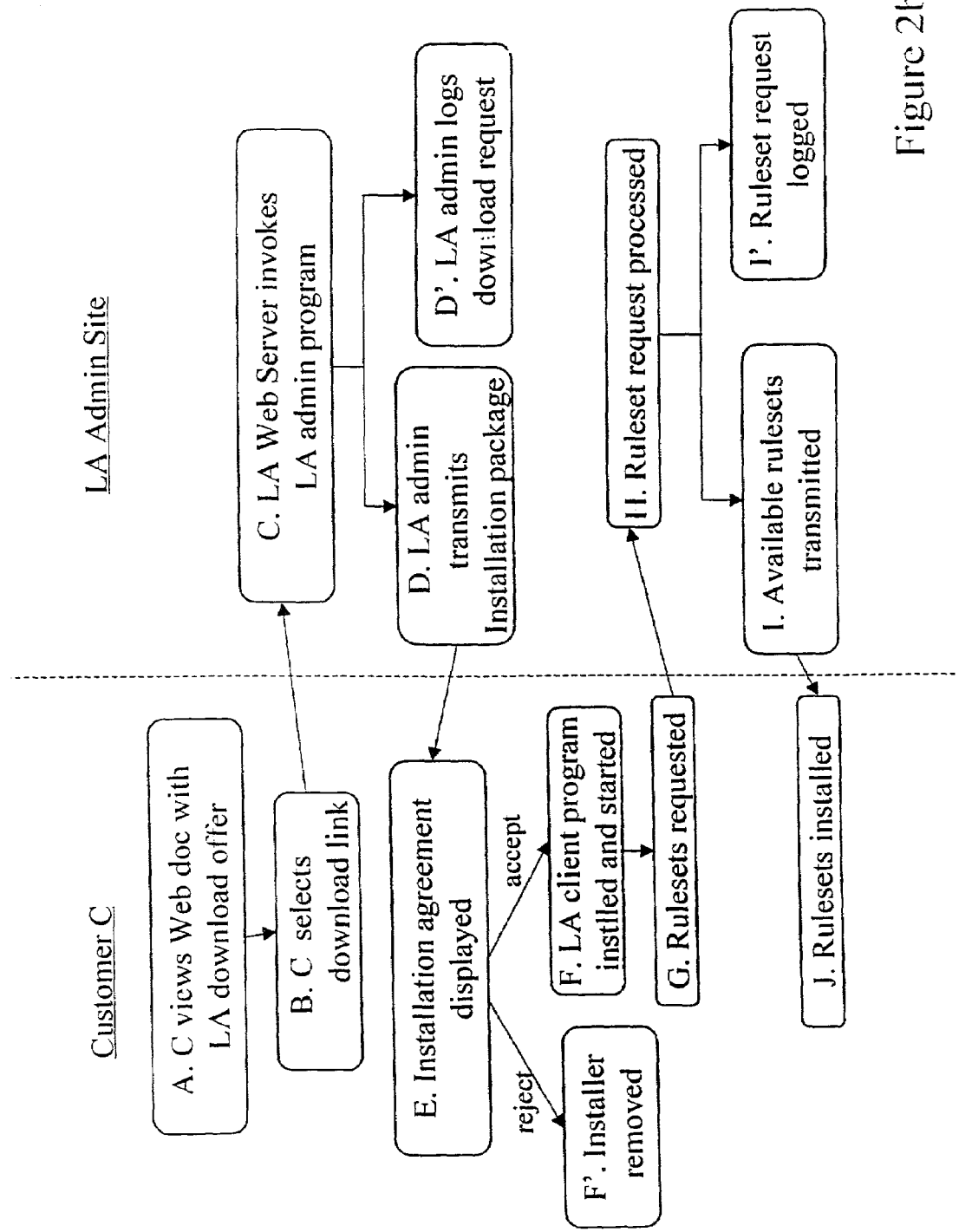
FIG. 2b is a flow diagram illustrating the process for a customer download of the client-side local assistant core.

A preferred method for downloading the local assistant client-side software by a customer is now described. FIGS. 2a–2b depict the flow of information and sequence of events in an example scenario of this process.

Referring to FIG. 2a, a customer accesses an assisted merchant's web site 240 via the customer computer 100. The customer computer contains a conventional web browser 202 (viewed as a interaction manager) which communicated with the assisted merchant's web server 241 using the HTTP protocol. As depicted by events A and A in FIG. 2a, the assisted merchant's web server 241 accesses a local store of HTML documents 242 that can be requested, retrieved and viewed by the customer using the web browser 202. The retrieved document (depicted in FIG. 2a as 243 on the server side and 201 on the client side) contains a download link 208 to the local assistant Admin system site 110. For example, the URL to embedded in a download offer from the Top Moxie Agent might look like:

https://secure.topmoxie.com/get-download.asp

Preferably, the document also contains descriptive information about the assisted merchant and the local assistant system that will encourage the customer to proceed.

Again referring to FIGS. 2a–2b, upon clicking or other wise selecting the download link 208 of the assisted merchant's document 201 (event B), the web browser 202 communicates with the local assistant Admin web server 111 which further communicates with the local assistant Admin program 112 (event C) to retrieve the system installation package 116. The installation package 116 is transmitted, using a cure protocol such as HTTPS, to the customer computer 100 to execute (Event D) and, concurrently, the download request is logged (event D). The customer is shown an installation agreement window (event E) which provides authentication information and allows the customer to accept or decline installation of the local assistant client-side package removes itself from the customer's computer 100 (event F). If the customer accepts in the installation agreement, then installation continues: the local assistant client-side code 104 is copied into a designated folder, the local ruleset database 105 database 106 are initialized, and the local assistant program 104 is started (event F). The client-side program analyzes the HTML document 201 containing the download link 208 to determine which application rulesets to download. The local assistant client program 104 transmits a request for rulesets to the local assistant server 111 (event G) which in turn invokes the local assistant admin program 112 (event H). Those requested rulesets that are available for download are transmitted to the local assistant client-side (event I) and stored in the local ruleset database 105 (event J). Concurrently, the local assistant admin program 112 logs the request in the admin ruleset database 114 (event I).

In FIG. 2a, the dashed line enclosing the local assistant components 104, 105 and 106 is used to indicate that these components are not initially present, but are present after the download completes.

Although the above describes the case in which the local assistant program download link is contained in an assisted merchant's HTML document, this is not necessarily the case. Links from download of the core system and non-merchant specific rulesets could be placed in any HTML documents, for example as advertisements placed by the local assistant agent. The intent is that the local assistant client-side core system be freely and widely available.

4. A Web Assistant Application

Figure 3A:
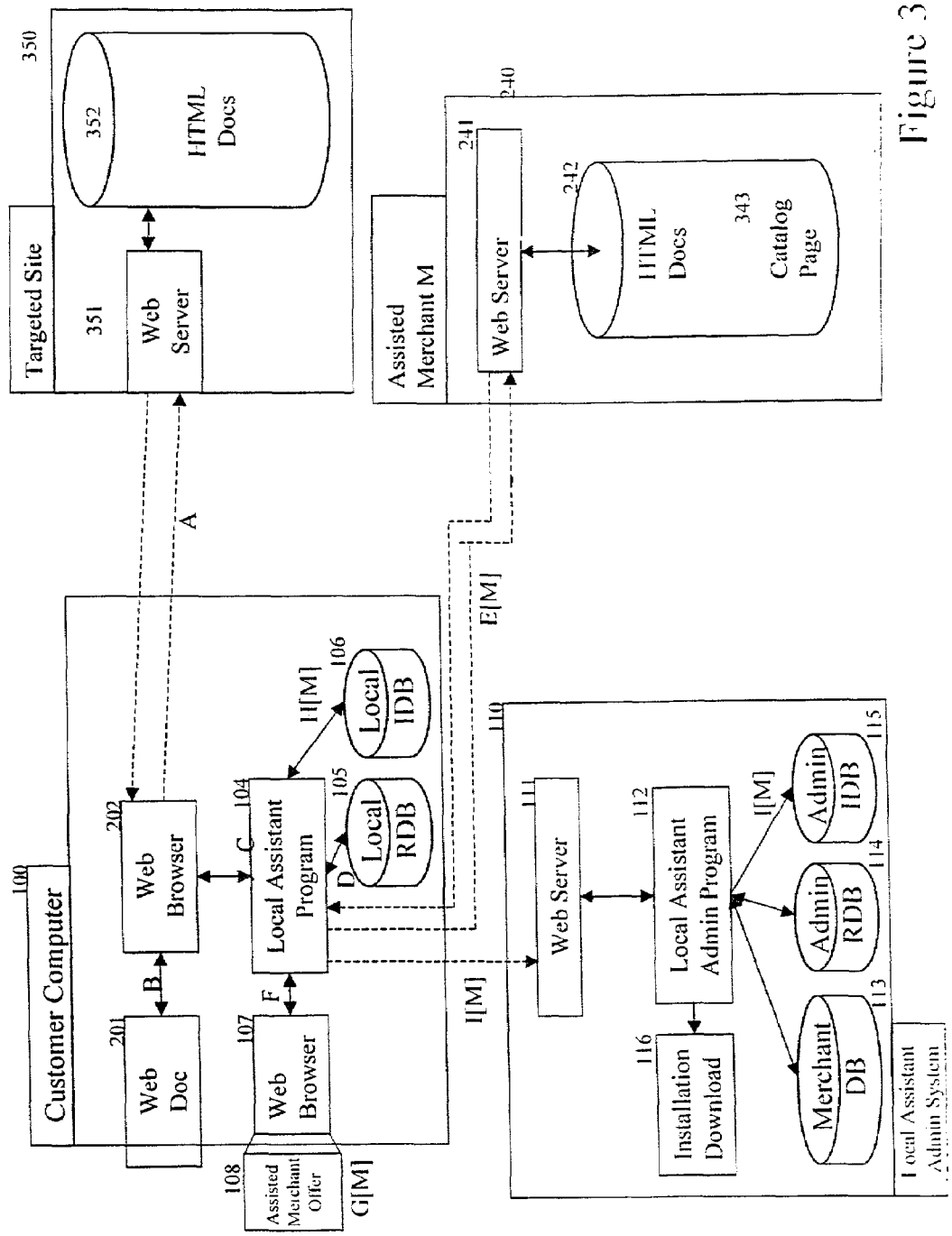
FIG. 3a is a diagram of the local assistant system including flow paths for a web assistant application and a loyalty program assistant application.
Figure 3B:
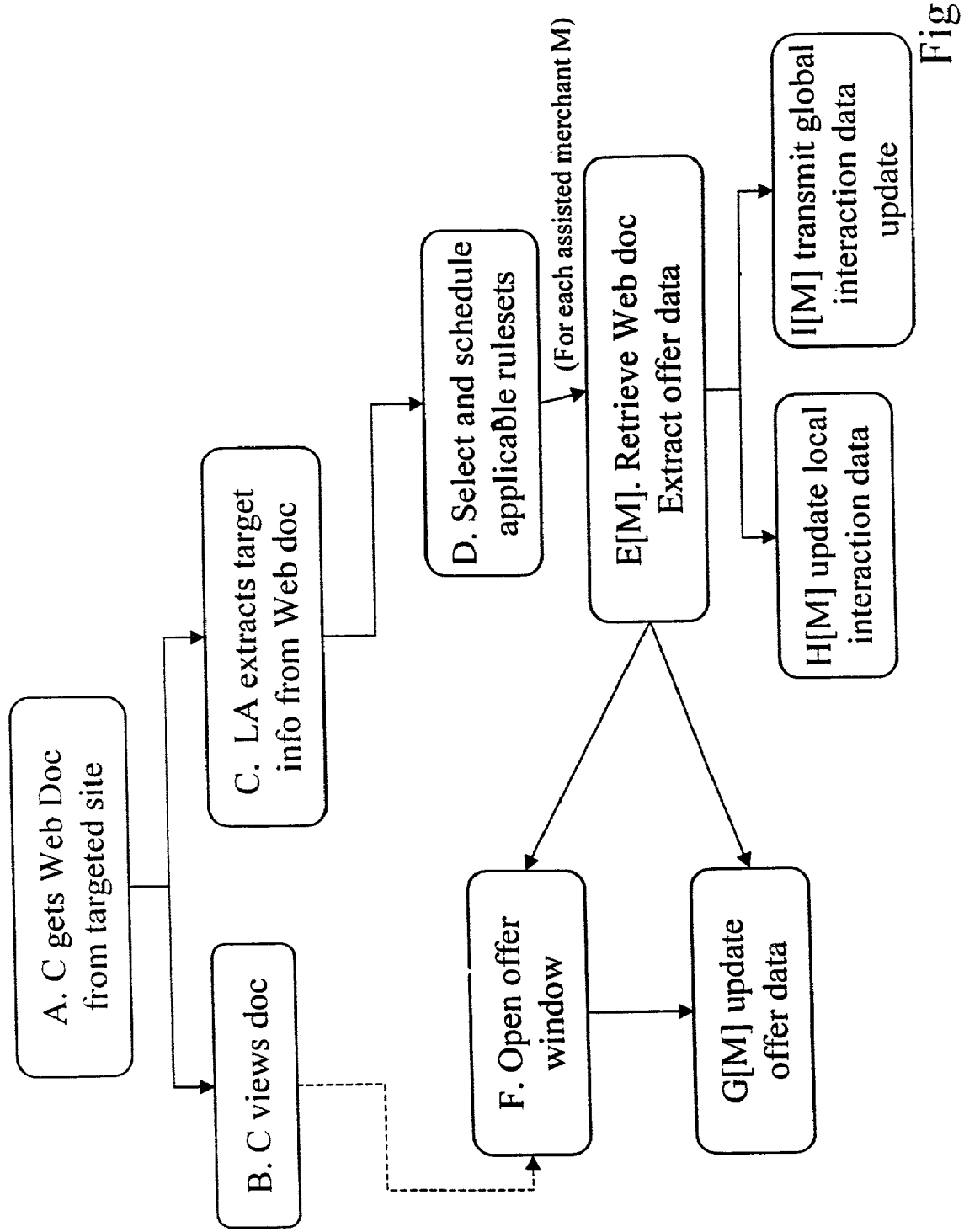
FIG. 3b is a flow diagram illustrating the process for the web assistant application and the loyalty program assistant application.

FIGS. 3a–3b illustrate the flow of information and sequence of events when a local assistant web assistant application operates on a customer computer 100. The customer (via the web browser 202 interaction manager) request and is presented with a web document 201 retrieved from a targeted site 350 (event A). The customer view the retrieved document 201 (event B). Concurrently, the local assistant client program becomes aware that a new page is being viewed by interaction with the system resource manager (not depicted in FIG. 3a) and the web browser 202 (event C). Rules to analyze the web document being viewed 201 are obtained from the rule database 105 and used to analyze the document (event D). For example, if the document is an amazon.com catalog page for a book, them the following rule <PE>
<CatId>Stepinfo</CatId>
<tag>body</tag>
<steptype>traverse</steptype>
<merchant>amazon.com</merchant>
<feature>amazon.xml</feature>
<target>HTTP://www.amazon.com/exec/obidos<t/target>
<dataelement>isbn</dataelement>
<pattern>"ISBN:" word:</pattern> discovers the ISBN of the book being considered. It extends the current information context by associating the word following "ISBN:" in an HTML document to the name :isbn". Below is a fragment of the HTML source for a book catalog page from amazon.com.

<html>
<head>

```
<title>Amazon.com; buying info: On Writing: A Memoir
   of the Craft</title>
</head>
...
<font face="Arial, Helvetica" size+-2>Scribner: ISBN:
   0684853523
</font><br>
...
</body>
</html>
```

The above rule executed in the context of this page would add

Isbn=0684853523

To the information context. A similar rule is used to discover the price.

An assisted merchant using the web assistant will define bid rules that determine for each target merchant of interest what form of offer should be make, if any, when the customer is looking at a particular catalog page. For example, the assisted merchant might have a rule that meets or underbids the price of an amazon.com item, but officers its standard price with free shipping when bidding against barnesandnoble.com. In either case, the ruleset for the assisted merchant will contain a rule to retrieve and analyze the assisted merchant's catalog page containing the item of interest and them to use this information in conjunction with the bid rules to produce an offer. For example the following rule will obtain price information for a book from fatbrain-.com:

```
<PE>
<CatId>StepInfo</CatId>
<Key>fatbrainsearchprice</Key>
<feature>fatmaven.xml</feature>
<steptype>search</steptype>
<sets>price reference title</sets>
<webquery><Add>
http://www1.fatbrain.com/asp/bookinfo/
   bookinfo.asp?theisbn=!ISBN
</Add></wequery>
</PE>
```

Returning to FIGS. 3a–3b, the local assistant client program executes the rulesets for each web assistant assisted merchant M (events E[M]). A product catalog document 343 is requested from the assisted merchant's web site 240 and analyzed using targeted rules to extract information needed to make an offer, for example the book price. If any offer becomes available, then an offer window is made visible (event F) and further offers are presented as they become available (event G[M]). In addition, the web assistant ruleset for a given assisted merchant M may store offer information in the local interaction database 106 (event H[M]) and may also request updates of the local assistant admin interaction database 115 (event I[M]).

Figure 3C:
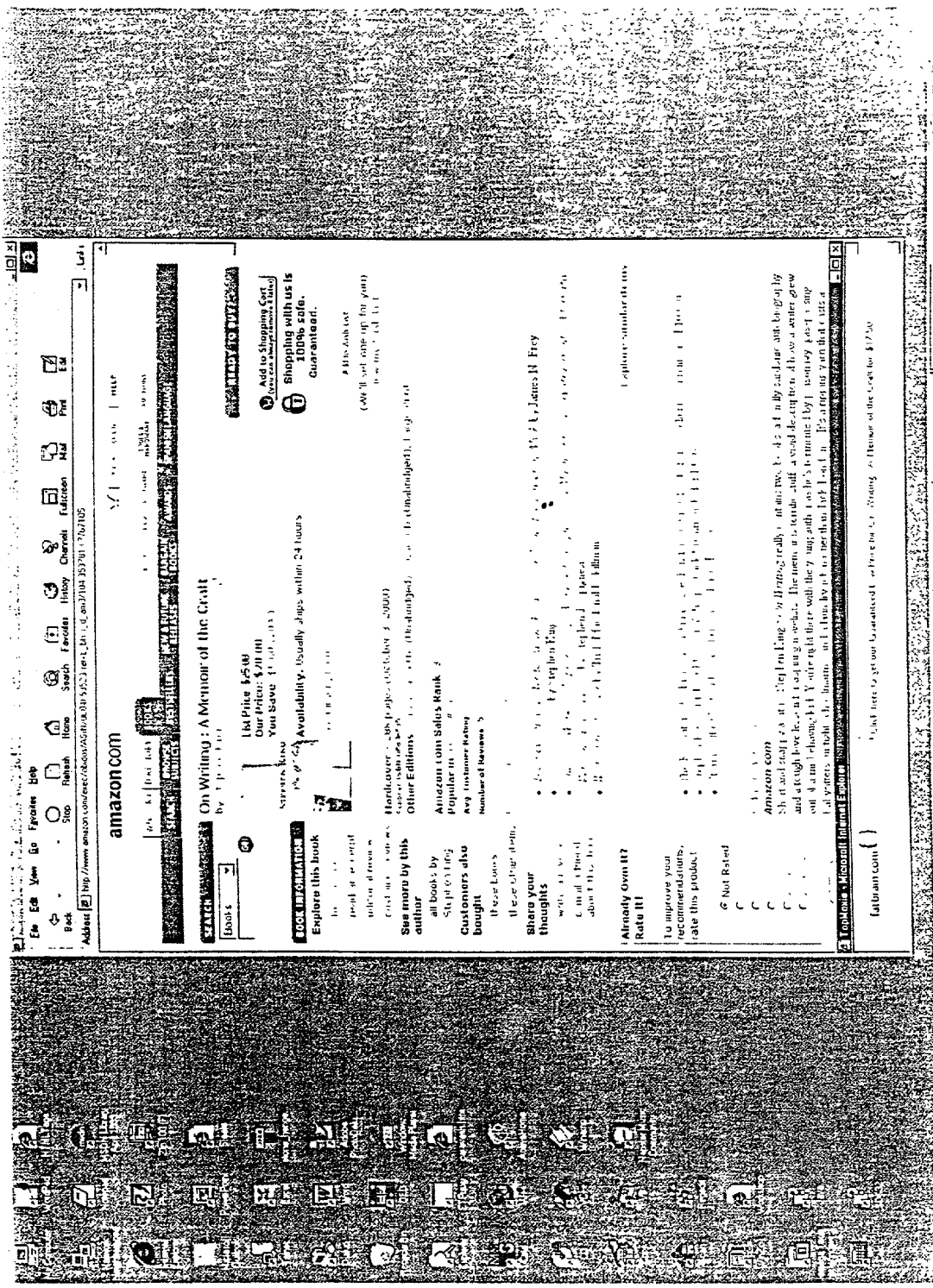
FIG. 3c is a screen shot illustrating the web assistant application.

FIG. 3c is a screen showing an offer from FatBrain in response to the customer visiting a page from the Amazon book catalog.

5. A Loyalty Program Assistant Application

FIGS. 3a–3b also can be used to illustrate the flow of information and sequence of events when a local assistant loyalty program assistant application operates on a customer computer 100. Events A-D are the same as for the web assistant application discussed above: the customer views a web document 201 from a targeted site 350 and the local assistant client program uses target document rules to extract relevant information, for example, the ISBN and price of a book.

An assisted merchant using the loyalty program assistant will define rules for determining the participating merchants and for each merchant, relevant attributes and a link to a loyalty program entry to their site. For example, schoolcash-.com is an intermediary for a school rebate program whereby participating merchants donate a percentage of each purchase through this program to the school of the purchaser's choice. The relevant attribute in this case is the percent rebate—each merchant may be different. In addition to the participating merchant data, there are rules for getting a price quote from each targeted participating merchant that sells the product in question. Finally there are rules from combining the premium and price data to produce an offer. For each loyalty assisted merchant M, the local assistant client program executes the associated rulesets. (event E[M]).

Figure 3D:
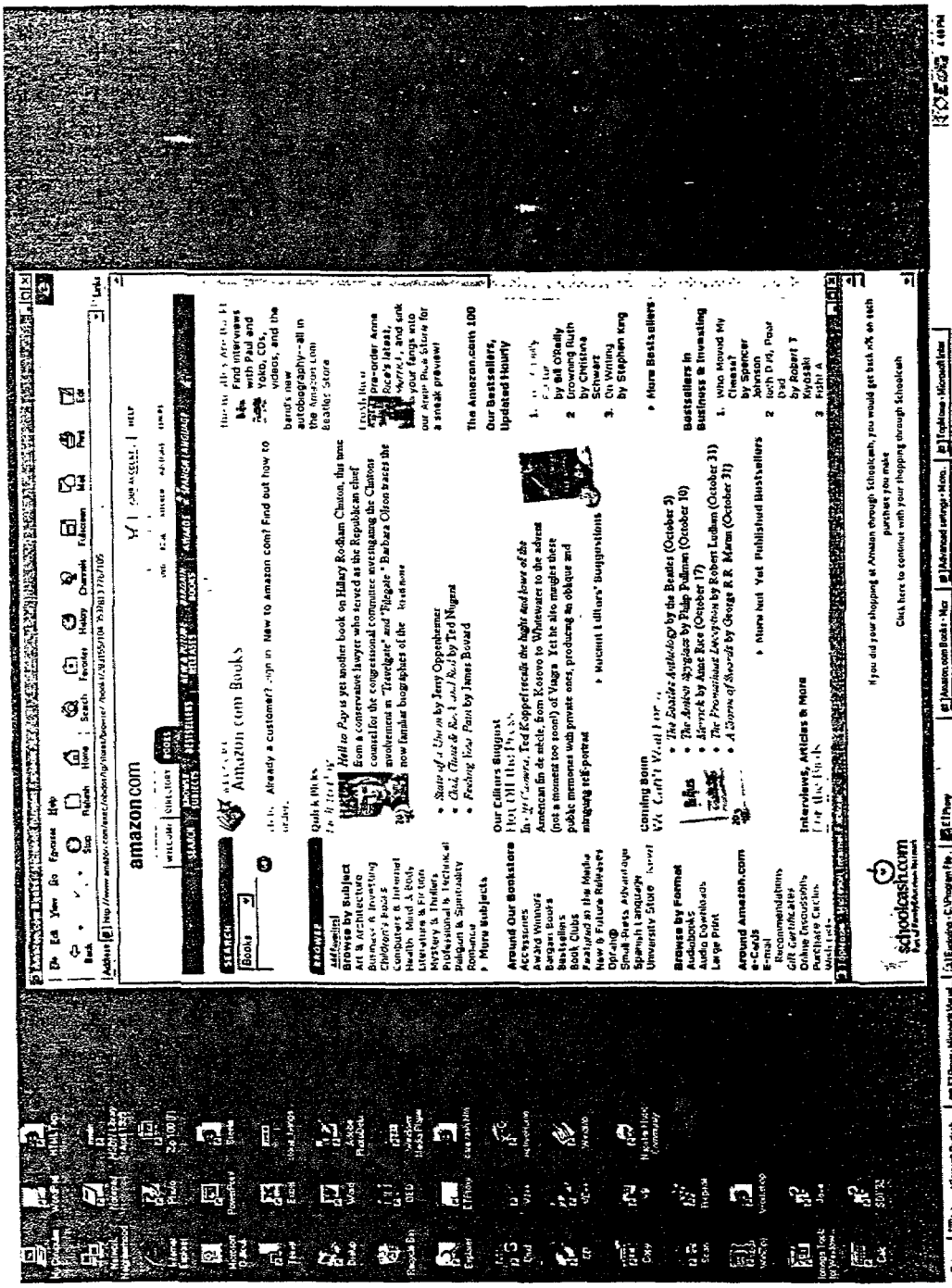
FIG. 3d is a screen shot illustrating the loyalty program assistant application.

As in the case of the web assistant Scenario, an offer window is made visible, offers are presented and local an admin interaction databases may be updated (events F,G-I [M]). FIG. 3d is a screen shot showing an offer from SchoolCash to a customer visiting a site from the Amazon book catalog. The offer reminds the customer of the Amazon rebate rate and provides a convenient link for the customer to make a purchase through the loyalty program.

A customer's ruleset database may contain both web and loyalty assistant rulesets, and, in this case, the applicable rules from both sorts of ruleset will be executed.

In a variation of the loyalty program assistant, there are rules to determine the participating merchant data dynamically, before gathering the data to make offers. The rules request web documents from the assisted merchant's web site and analyze them to obtain the needed information.

6. Listener Assistant Application

Figure 4A:
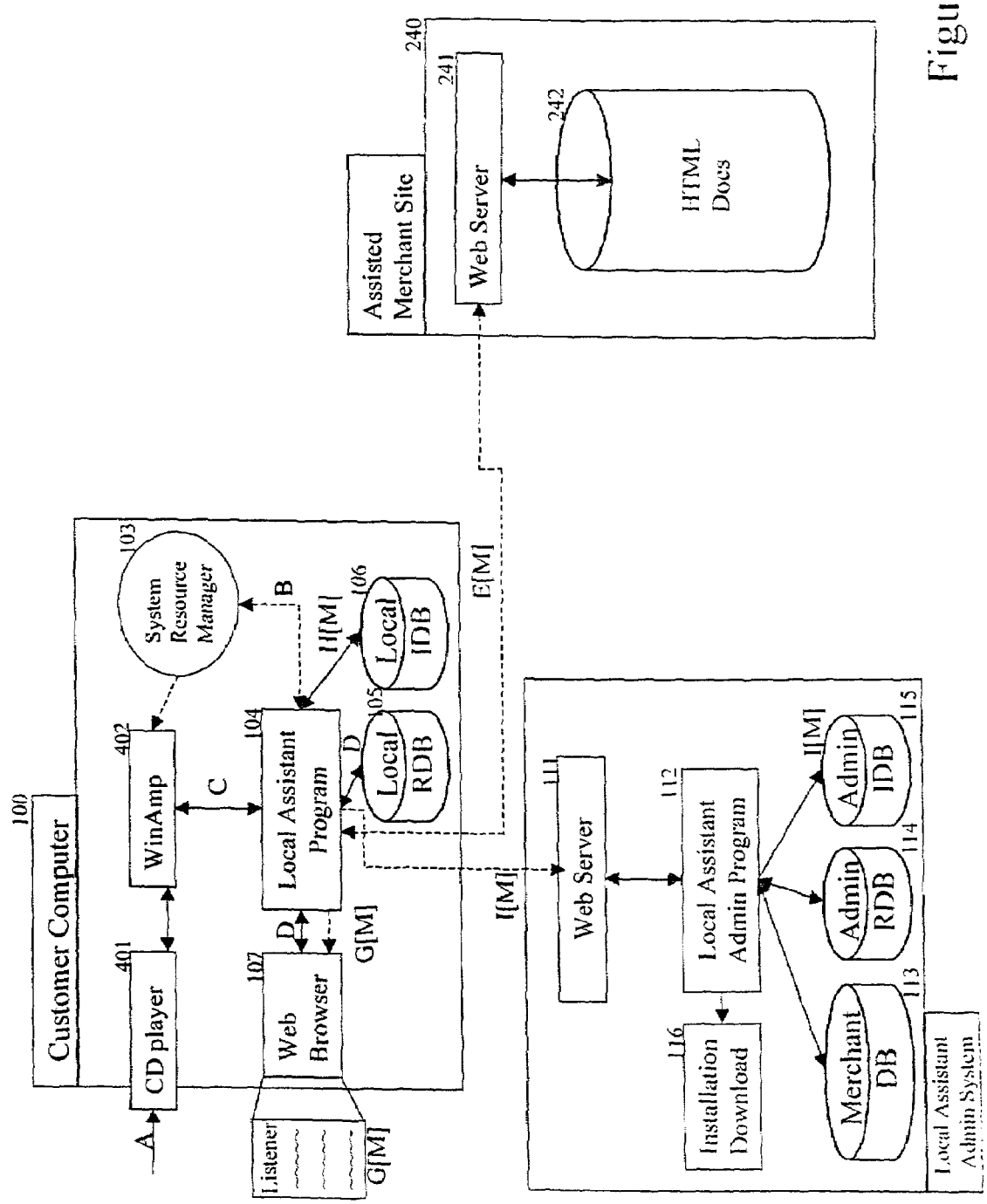
FIG. 4a is a diagram of the local assistant system including flow paths for a listener assistant application.
Figure 4B:
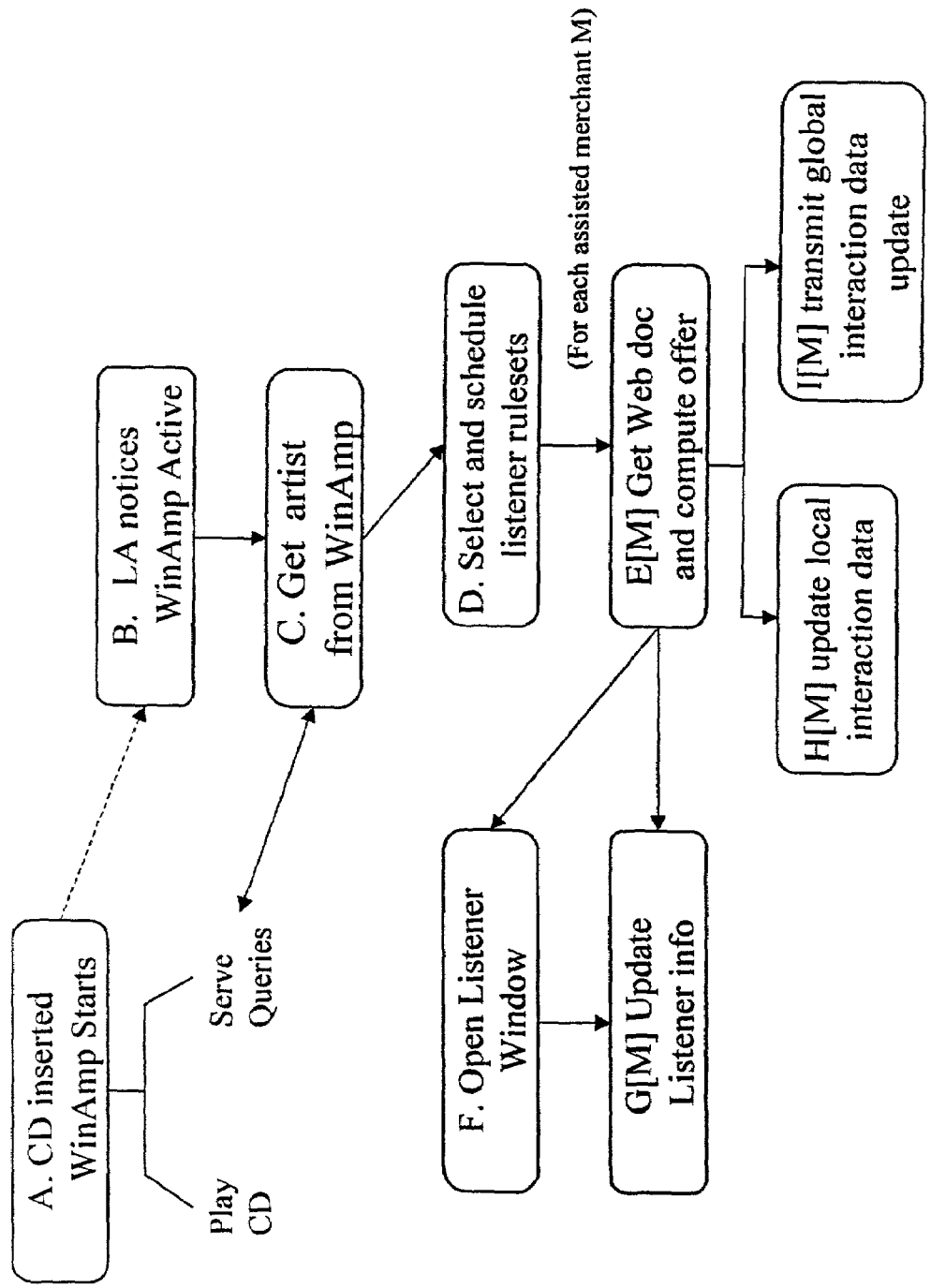
FIG. 4b is a flow diagram illustrating the process for the listener assistant application.
Figure 4C:
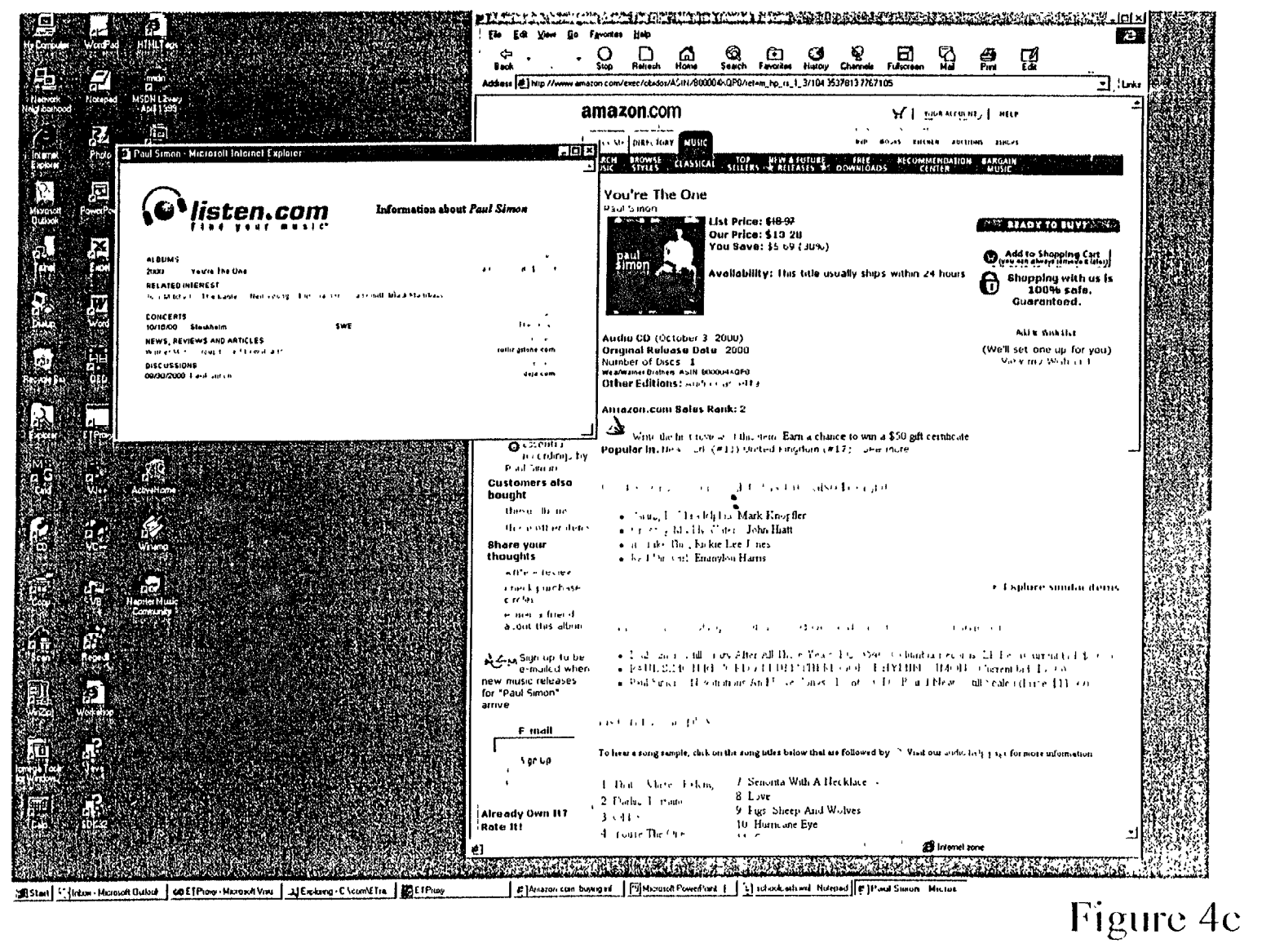

FIGS. 4a–4b illustrate the flow of information and sequence of events when a local assistant listener assistant application operates on a customer computer 100. In this scenario, the customer inserts a CD into the CD player 104 and a media player application 402 is started, for example WimAmp (event A). The local assistant client program 104 becomes aware that a CD is playing interacting with system resource manager 103 (event B) and request artist information from the WinAmp player (event C).

A listener assisted merchant will have a ruleset with rules to generate offers related to the artist player. For example, amazon.com or cdnow.com might have rues to collect a list of all the CDs by that artist in their catalog and present this along with links and possibly price/availability information. An online ticket agency might have rules to gather a list of all the upcoming concerts by this artist (and possibly artist considered to be related in some way) for which the agency sells tickets. Other information, such as reviews and articles relating to the artist, could also be collected.

Returning to FIGS. 4a–4b, the local assistant client program selects from the ruleset database 105 for each listener assisted merchant M and schedules them for execution (event D). Again, as soon as any offer is available, a listener display is made visible (event E). The selected rules for assisted merchant M are executed (event F[M]). This may result in retrieval and analysis of web documents and consequent production of offers. As in the case of the web and loyalty assistants, any offers produced are

```
<mkalist>whendone<mklist>donecnet</mklist></
   mklist>
</getpage>
</Do>
</PE>
```

This rule specifies that it should executed every 15 minutes. Execution of the rule sets a flag used to check whether any new news was found. The cnet.com ruleset also contains rules (not shown) to analyze the summary page and collect a list of current news items, each item containing a description and a link to the actual news document. The local interaction data contains a history of news items already seen and also a list of topics of interest to the customer (maintained using the customization application described below). In the depicted scenario, the local assistant client program 104 executes the cnet news gathering task (event A). A news summary page 543 is retrieved from the News assisted merchant's web site 540 (event B). A news window is made visible (event C); this window may initially contain advertisements provided by the News assisted merchant. Using the news summary from event B, and the history and news preferences obtained from the local interaction database, a list of new items on topics of interest is generated (event D) and displayed in the news window. The local interaction database is them updated to reflect the most recent news retrieved (event F).

Figure 5A:
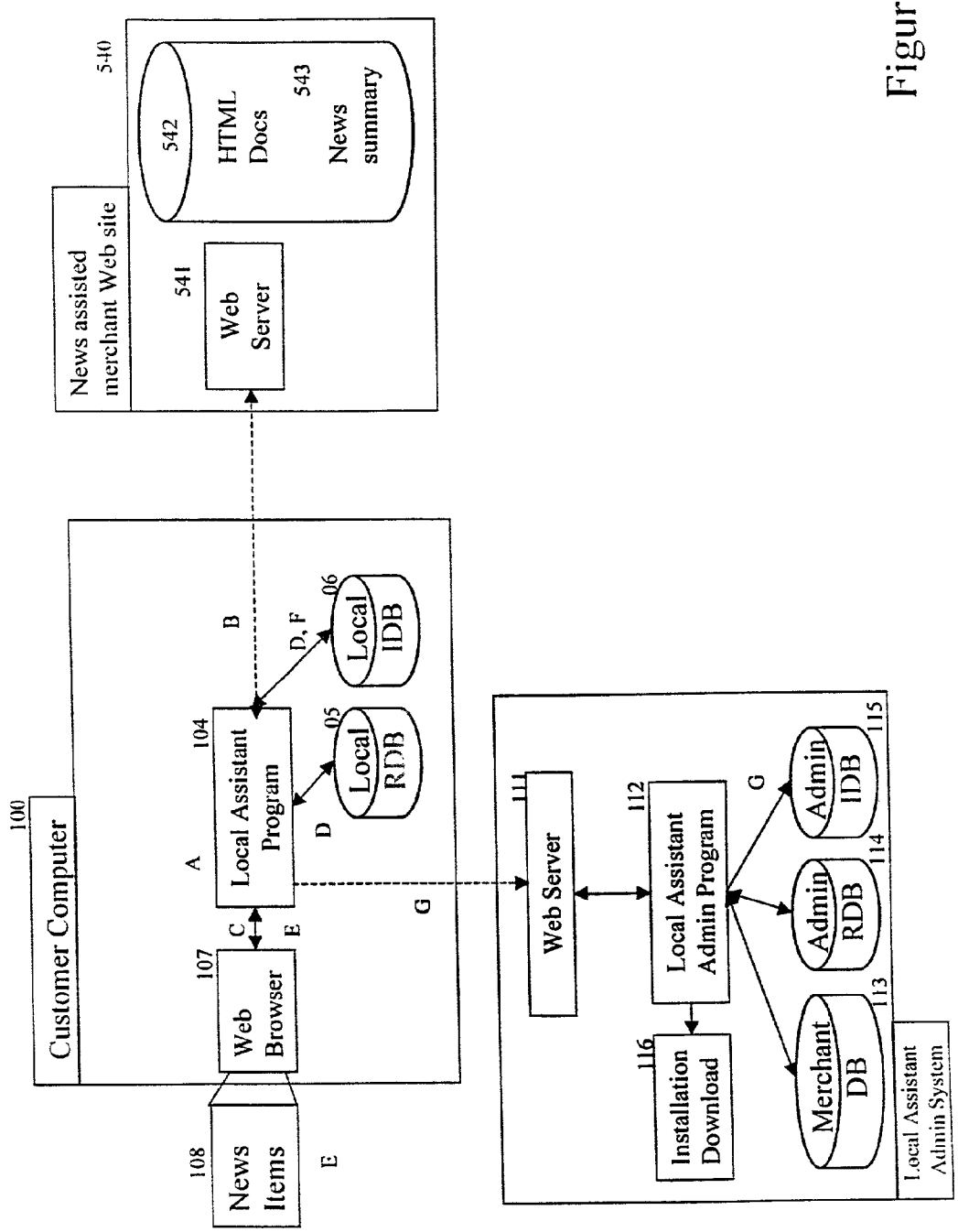
FIG. 5a is a diagram of the local assistant system including flow paths for a news assistant application.
Figure 5B:
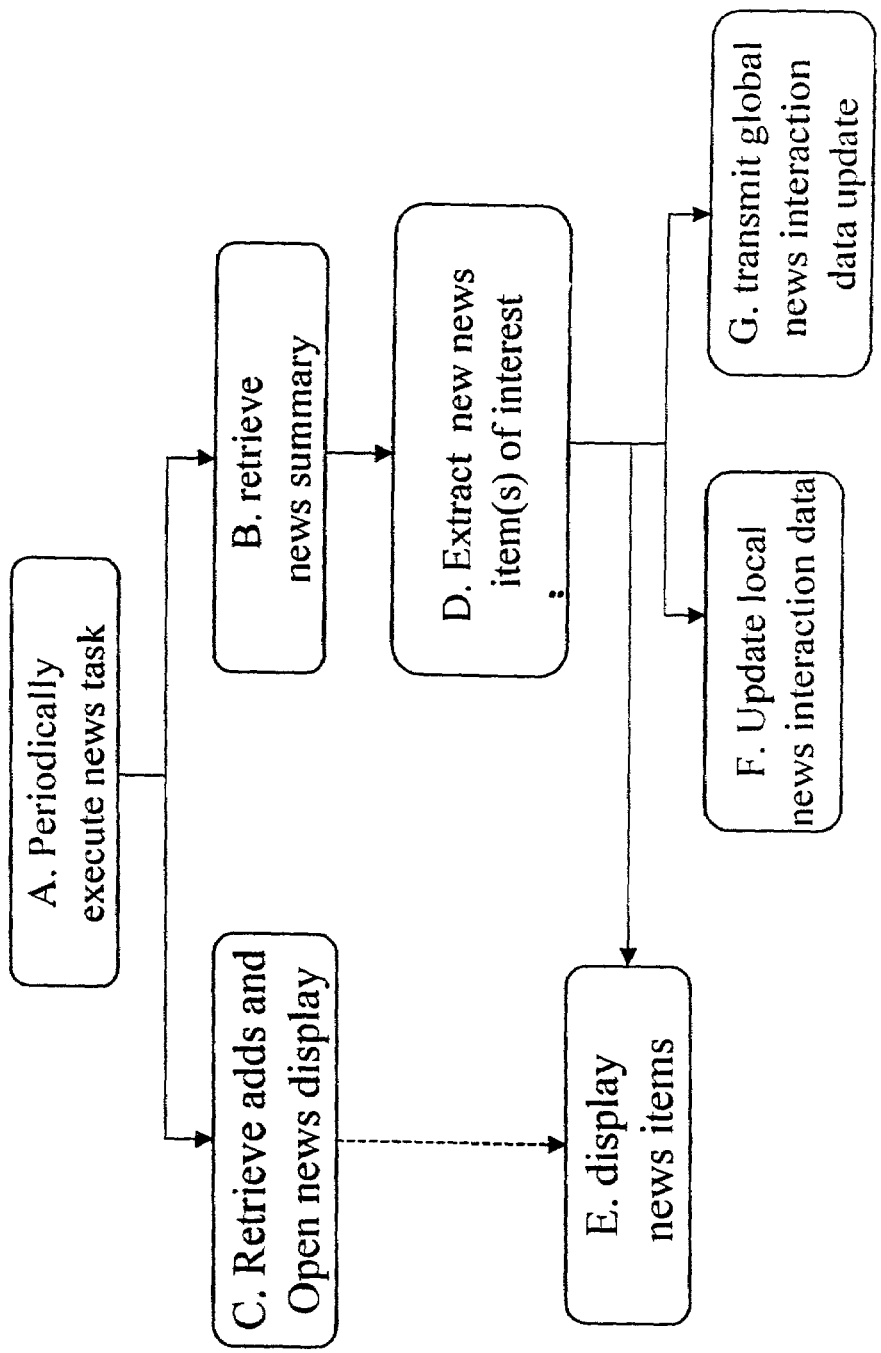
FIG. 5b is a flow diagram illustrating the process for the news assistant application.
Figure 5C:
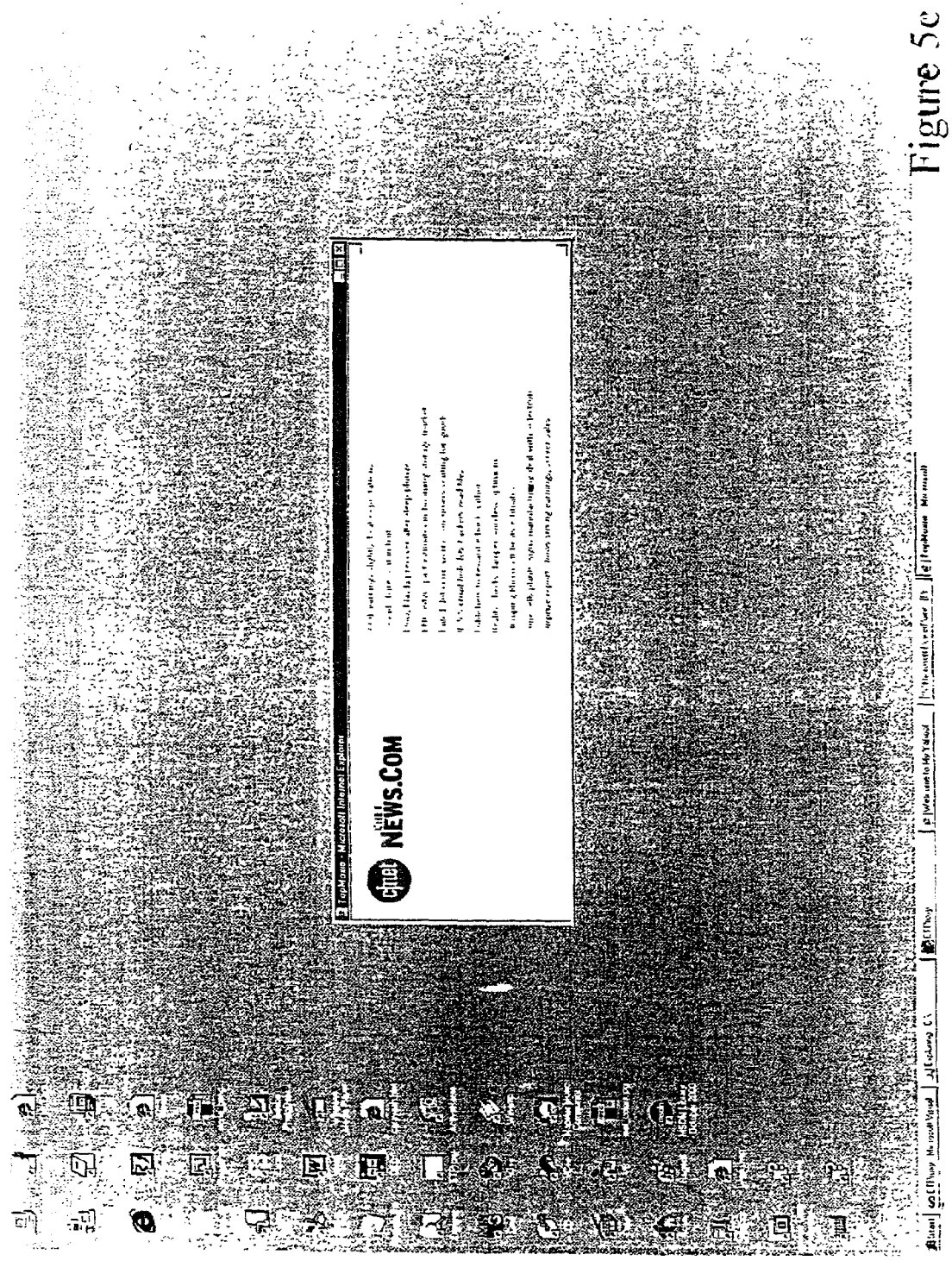
FIG. 5c is a screen shot illustrating the news assistant application.

FIG. 5c shows a screen shot of a CNET news offer with several technical news items.

8. Local Assistant Client-Side Customization Application

Figure 6A:
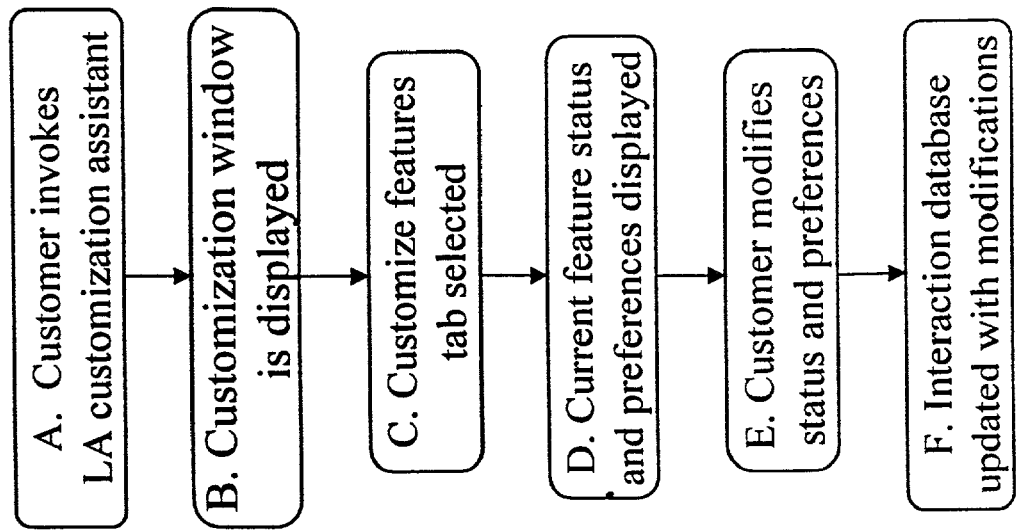
FIG. 6a is a diagram of the local assistant system including flow paths and a flow diagram illustrating the process for a customer customization application.
Figure 6A:
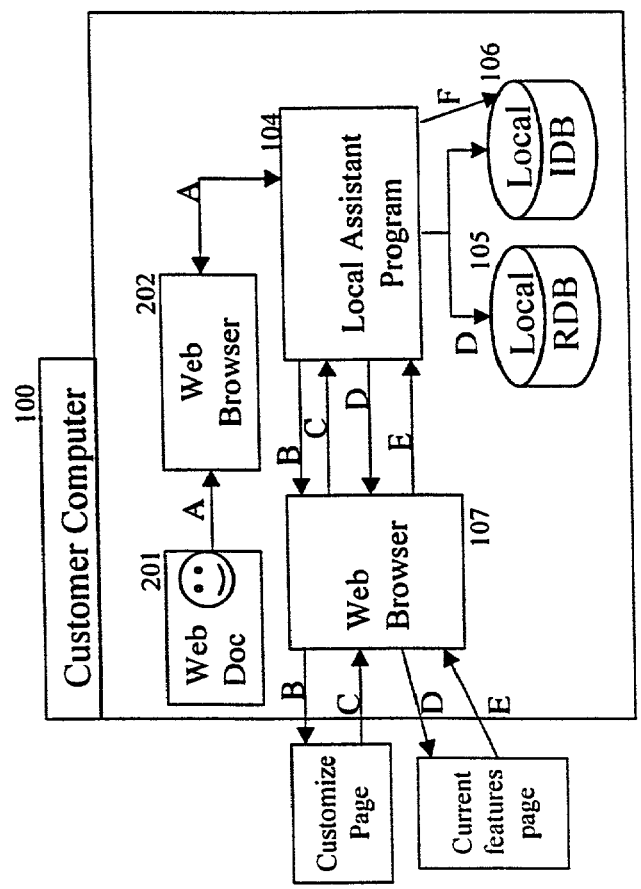
Figure 6B:
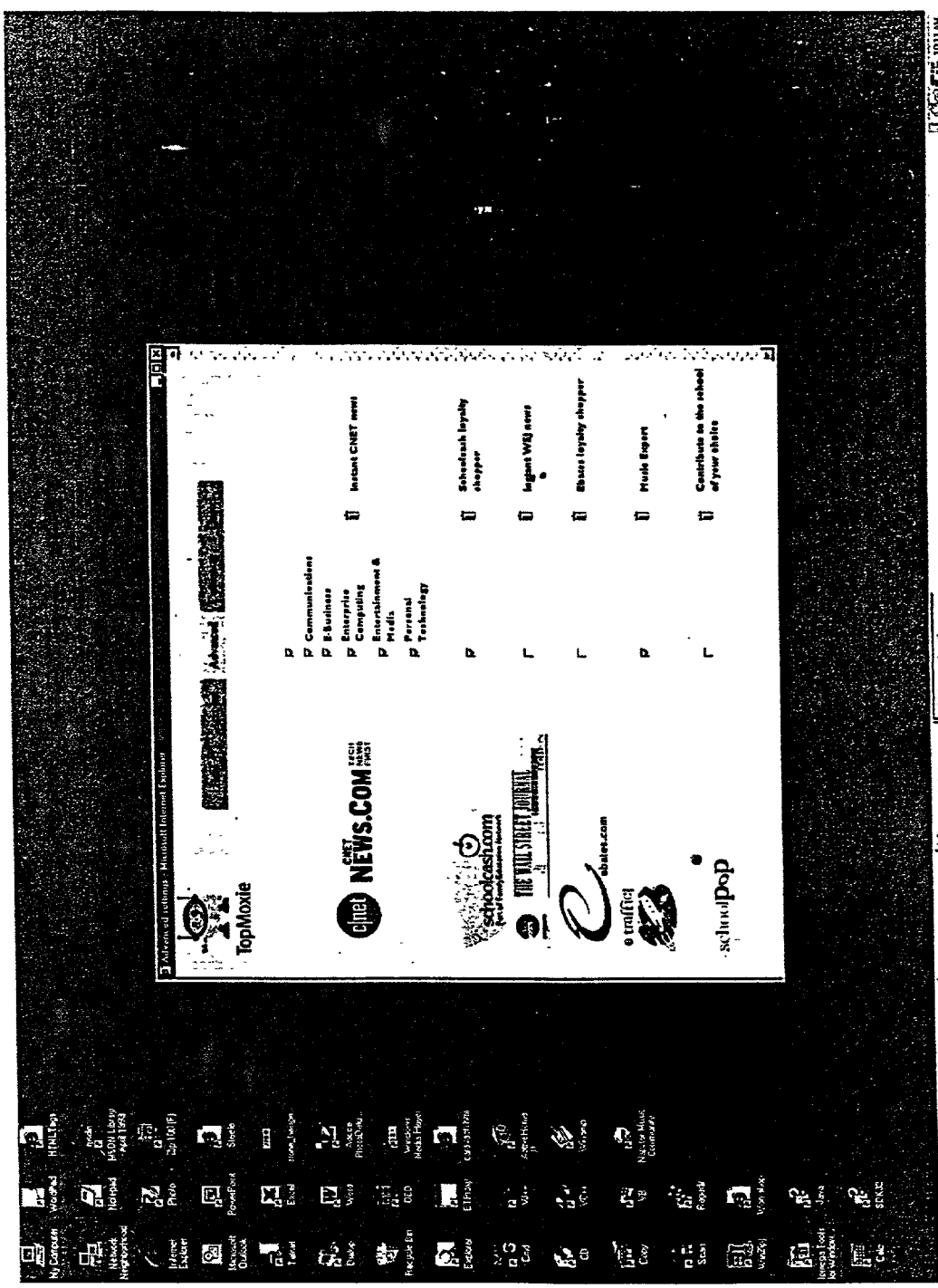
FIG. 6b is a screen shot illustrating the customer customization application.

FIG. 6a illustrates the flow of information and sequence of events from one scenario in which the customer interacts with the local assistant Client-side Customization assistant. The ruleset for this assistant is part of the core system download. In this scenario, the customer accesses the Customization application, possibly by a browser context menu item or an icon on the toolbar (event A). A customization widow is displayed with tabs for several options (event B). The customer chose the advanced tab (event C). A list of rulesets (called "features" in the Top Moxie preferred embodiment of the Local assistant) and options for each feature, with the customer's current preferences, is displayed using rules that query the ruleset and interaction database to gather this information (event D). The customer checks the personal technology and the entertainment topic boxes. The customer also checks the SchoolCash box to enable this feature and unchecks the Schoolpop box to suspend application of the rules of this assistant ruleset (event E). The interaction data is updated to reflect the modified status a preferences (event F). FIG. 6b is a screen shot showing the current features option of the Customizer assistant.

Figure 7A:
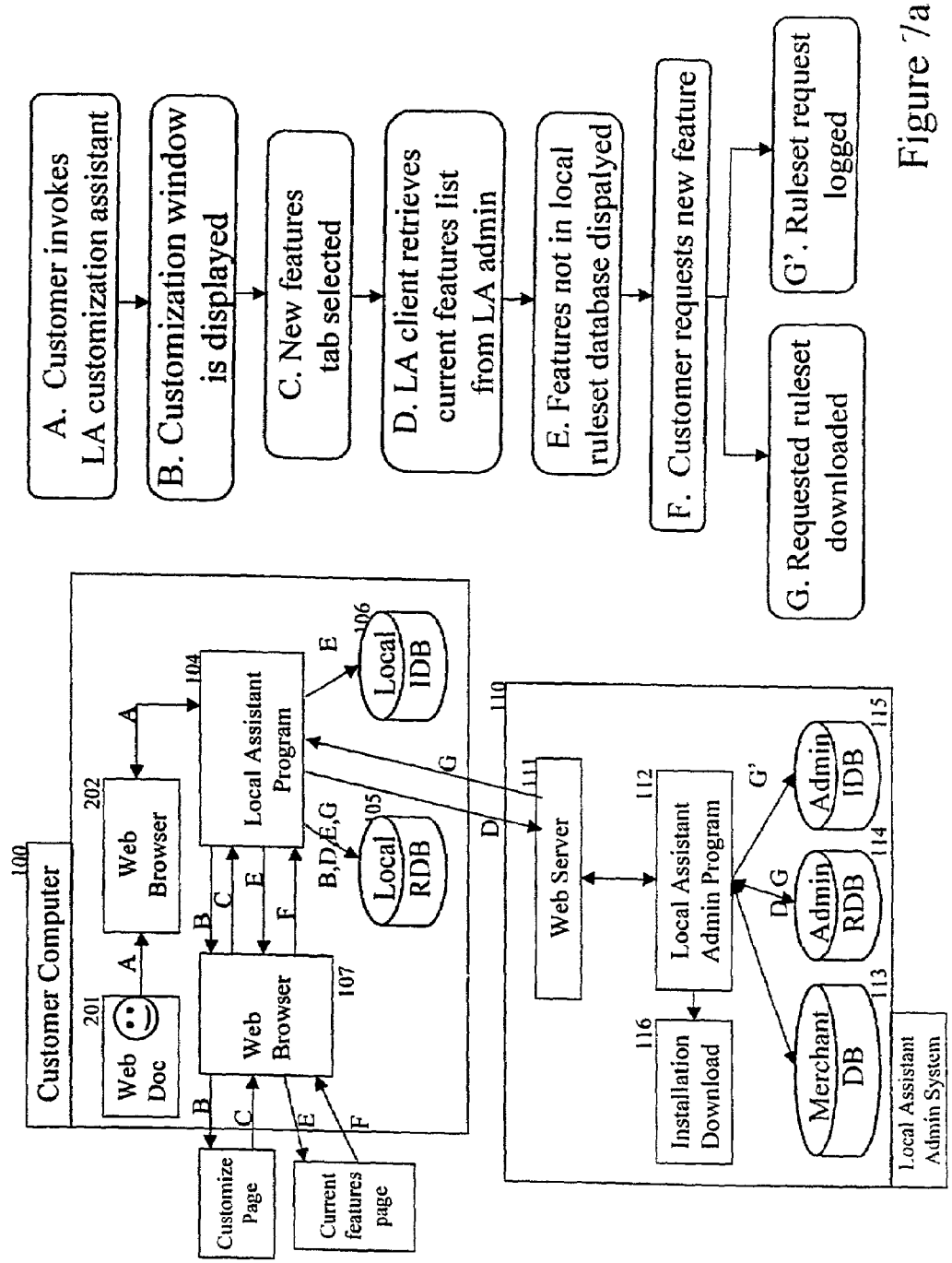
FIG. 7a is a diagram of the local assistant system including flow paths and a flow diagram illustrating the process for a ruleset viewing application.
Figure 7B:
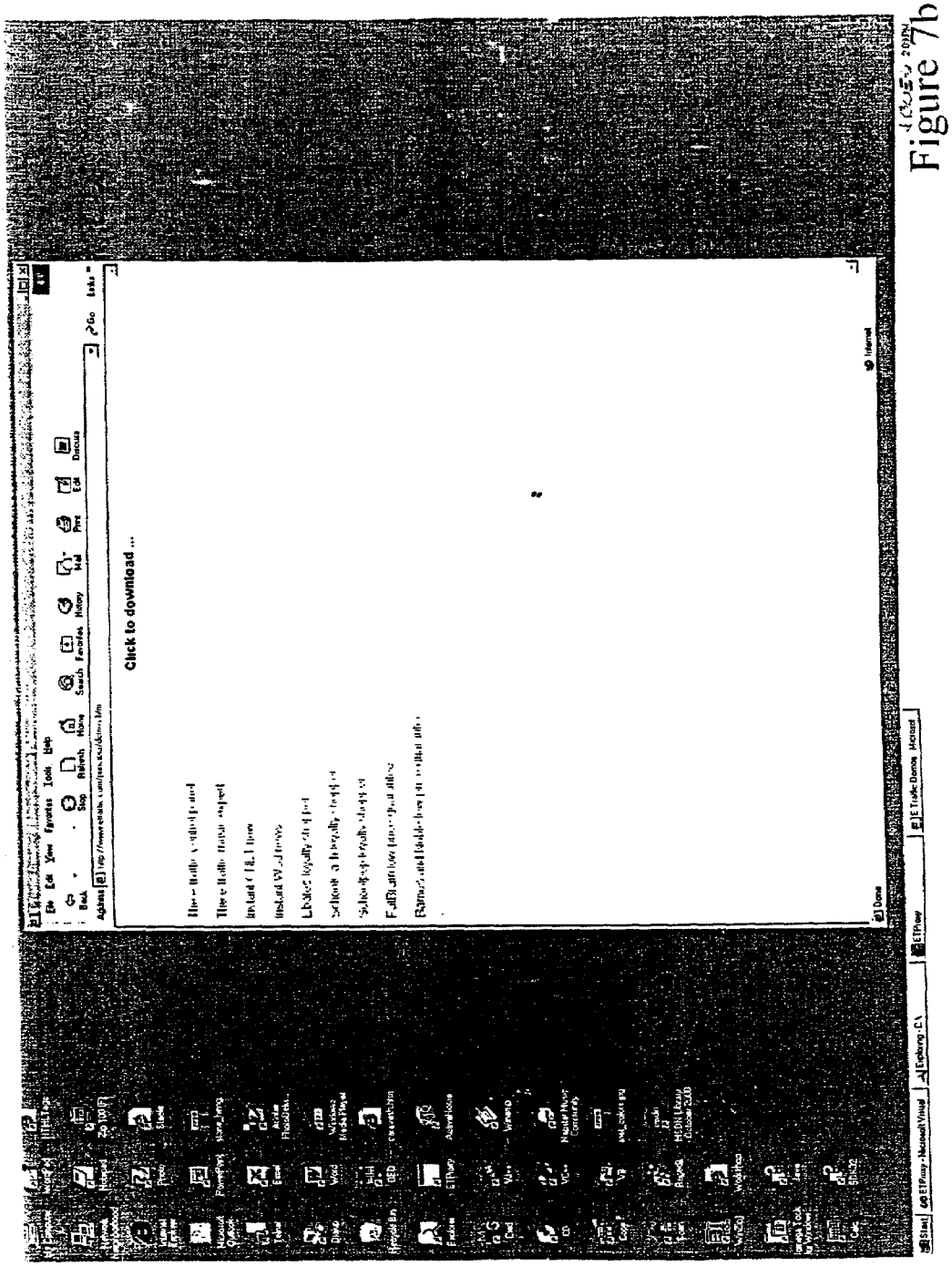
FIG. 7b is a screen shot illustrating the ruleset viewing application.

In another scenario, depicted by FIG. 7a, events A and B (invoking the customization assistant) are the same as in the first scenario described above. In this scenario, the customer selects the tab to view any new features that might be available (event C). The local assistant client-side program 104 retrieves a list of the currently available rulesets from the legal assistant admin site 110 (event D), A rule to remove features from this list that currently exist in the local ruleset database 105 is executed, and the resulting list of features is displayed (event E). FIG. 7b is a screen shot showing a list of downloadable features. The customer requests the new SchoolCash loyalty shopper (event F). The feature is downloaded from the local assistant admin site 110 (event G) and the download request is logged by the local assistant Admin program (event G). The feature download event consists of several actions; the local assistant client-side program transmits a request form the ruleset to the local assistant server; the local assistant server confirms that another download of this ruleset is allowed, and transmits the encoded file containing the ruleset via HTTPS; and the local assistant client-side program adds the newly downloaded ruleset to the local ruleset database.

In a little more detail, direct interaction between the local assistant client-side system and the customer is accomplished using browser navigation and a special type of rule called protocol. Navigation to an URL having a specific form results in interpretation of the file part of the URL as the name of a protocol rule possibly followed by data to be passed. For example, in the Top Moxie implementation, navigation to the URL.

"Http:/127.0.0.1:8765/_etraffic_showagenda_"

executes the protocol named showagenda. The trailing_indicates that no data is to be passed.

B. The Mobile Assistant System

The mobile assistant system builds upon the local assistant system by incorporating mobile clients. The mobile clients are PDAs which have independent communication capabilities allowing their users to access the internet in a wireless manner. The mobile assistant system assists the PDA in communications with the internet and also allows the PDA remote access to an associated computer (personal agent). The functions described with regards to the local assistant above are also applicable to the mobile assistant system. The primary difference is that queries are transmitted from a mobile client directly or a mobile client and broker combination rather than from the customer computer as described with regards to the local assistant system. While various exemplary functions have been described to illustrate the types of functions that may be preformed, the local assistant and mobile assistant systems are not limited to the described functions, and are capable of performing many different functions not described in this application.

A primary difference between the local assistant and mobile assistant systems is that data transmitted to the mobile clients is simplified to be suitable for PDA's limited communications bandwidth and limited display (pixels). The mobile assistant system recognizes the different types of PDAs and is able to optimize display information for the specific PDA device. Another difference between the local assistant and mobile assistant systems is that information is only presented to a mobile client upon request. Pop ups and other unrequested reminders are not be transmitted to the mobile clients. Yet another difference is that the mobile client of the mobile assistant system has remote access to the personal agent.

Figure 8:
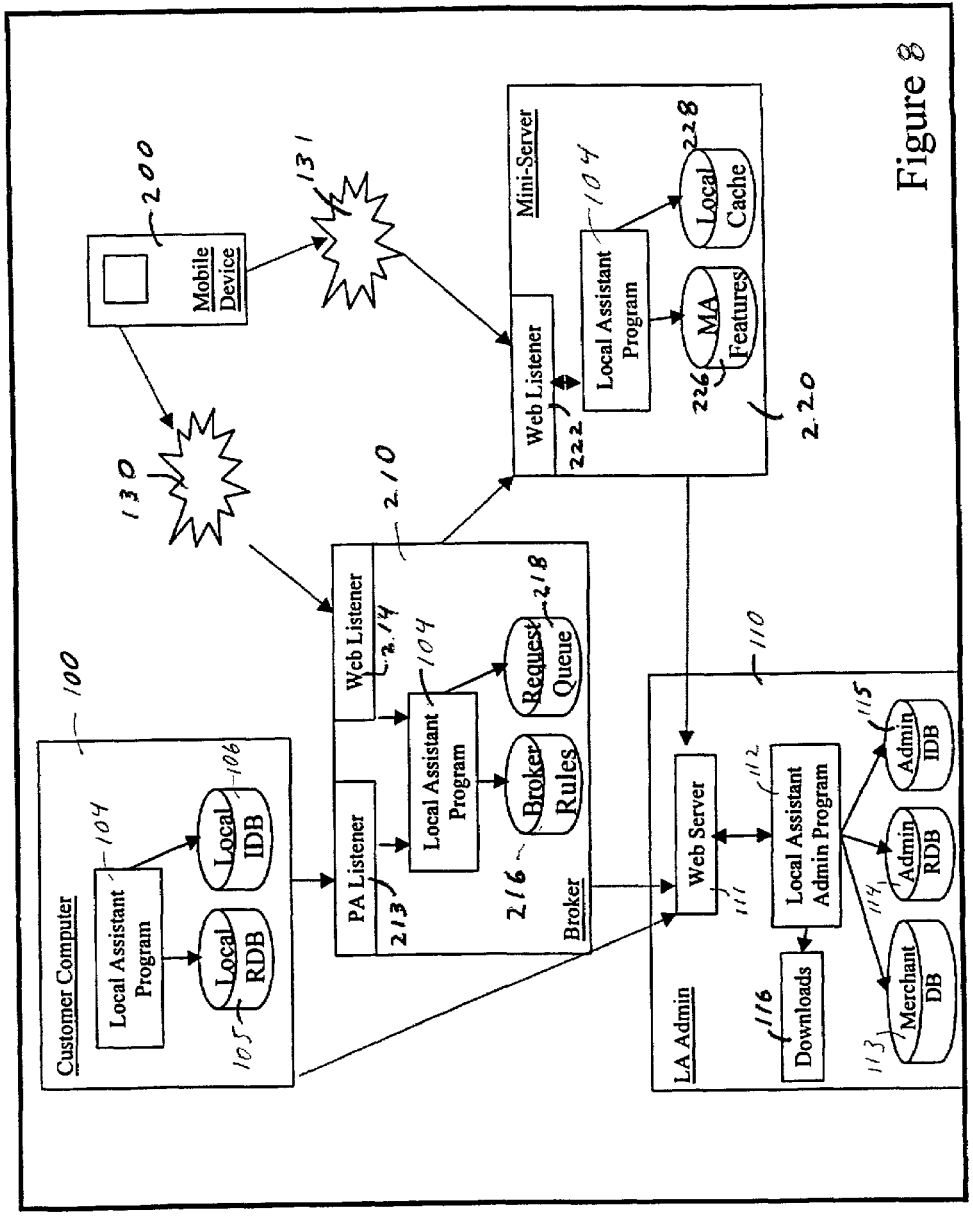
FIG. 8 is a diagram of the mobile assistant system.

In order to accommodate the needs of the mobile clients (PDAs), the mobile assistant system requires additional components. FIG. 8 illustrates an embodiment of the mobile assistant system which includes: a personal agent 100, a mobile client 200, a broker 210, a mini-server 220 and a mobile assistant administrative server 110. The mobile client 200 may be a PDA which communicates with the broker 210 through internet connection 130 and the mini-server 220 through internet connection 131. The broker 210 communicates with the personal agent 100, mini-server 220 and local assistant administrative server 110. The mini-server 220 and personal agent 100 may also communicate with the mobile assistant administrative server 110.

The communications channels may be secure or non-secure depending upon the security level of the mobile client queries. The mobile assistant system recognizes various query security levels: the lowest security level may be "public", a higher security level may be "restricted" and the highest security level may be "private." Public information requests include stock quotes, weather reports and any other unrestricted information. The request includes codes associated with the desired task.

The mini-server 220 and private agent 100 recognize the codes and may retrieve the instructions associated with the request code from the mini-server rules databases 105 and the personal agent rules database 226 respectively. For public queries, non-secure communications channels may be used however for restricted or private queries, secure connections may be required. Non-secure communications may be through normal internet communications such as HTTP. If secure communications are required data may be transmitted through HTTPS, encrypted internet transmissions or via inherently secure channels, such as a direct or dedicated connection. The security may also control which devices may be used to obtain information. In an embodiment, the mobile assistant system may only utilize "trusted" mini-servers when the security level of the query is restricted.

The mobile client 200 may be associated with a specific personal agent 100. The mobile assistant allows the mobile client 200 access to the memory and functionality of the associated personal agent 100. Because the information stored on the personal agent 100 is typically private, all communications between the mobile client 200 and the personal agent 100 may be assumed to be private in security level. Although FIG. 8 only shows a single mobile client 200 and personal agent 100 combination, the mobile assistant system is capable of supporting and distinguishing many pairs of mobile clients 200 and personal agents 100. In an embodiment, it also possible for a single mobile client 200 having the required authorization to access more than one personal agent 100 or multiple mobile clients 200 may have access to a single personal agent 100. In order insure that only authorized mobile clients 200 have access to the personal agents 100, security systems are used. An example of a security system is a "shared secret" user authentication system which requires the mobile client 200 to produce a password which is known by the personal agent 100 before access is granted. Various other security systems may be used which prevent unauthorized users from accessing the personal agents 100.

The mobile assistant system helps mobile clients 200 perform tasks and obtain information remotely. The mobile client 200 can interact with its associated personal agent 100 or the internet through the mini-server 220. In particular information is adjusted according to the type of mobile client 200 being used. For example, PDAs made by companies including Palm, Psion, Casio, Blueberry and Handspring have specific displays which are smaller in size than a normal computer monitor. When these devices access internet HTML web pages the information is not displayed in the same manner as a normal computer monitor because of the smaller size. Simply compressing the image will not be useful because the images will typically be too small to read.

The mobile assistant system adjusts the information to display by recognizing the type of device of the mobile client 200. The query submitted by the mobile client 200 includes an identification code which identifies the type of PDA being used. The local assistant kemal 104 of the mobile assistant system recognizes the identification code and obtains a rule associated with the identification code from a rules database. The rule is used to modify the data transmitted to the mobile client 200 to optimize the information for the specific visual display of the mobile client 200. The personal agent 100, broker 210 and mini-servers 220 each run the local assistant kemal 104. Display rules associated with the different mobile client identification codes are stored on data bases of the mobile assistant system components, rules database 105 for the personal agent 100, rules database 216 for the broker 210 and rules database 226 for the mini-servers 220.

Queries can cover a wide variety of functions including requests for news, online shopping, software downloads, public information, private electronic account access, audio/video downloading and streaming as described with reference to the local assistant system. Each query also includes a query type code for which specific instructions are used. For example, a query for news may actuate a rule which automatically gathers new headlines (with links to articles) on topics that are selected by the user. A personal scheduling query may actuate a rule which returns calendar reminders. On line shopping query may actuate a rule which obtains current product sales incentives and rebates from merchants of interest to the user.

The components of the mobile assistant system can operate independently and may be in communication or out of communication at any given time. Because the components are not continuously connected, the communications between the components must be coordinated. As discussed, the components of the mobile assistant system may communicate with each other through internet connections. In an embodiment, the components coordinate communications by utilizing "listeners" which detect the availability or presence of specific components and open internet connections. For example with reference to FIG. 8, the broker 210 may have a web listener 214 which detects when a mobile client 200 is trying to transmit a query. When a query is from the mobile client 200 is detected, a connection is established and the broker sends a reply header on the output stream to the mobile client 200. A similar process is applicable when the personal agent listener 212 of the broker 210 detects a signal from the personal agent 100 or when the web listener 222 of the mini-server 220 detects a query from the broker 210 or mobile client 200.

A query generated by the mobile client 200 includes information identifying: the type of request (public, restricted, private), the mobile client device, and the type of query. If the query is restricted or private it should also include identification and authorization information. The mobile client 200 can transmit public, restricted or private queries to the broker 210. Alternatively, the mobile client 200 can sent public queries directly to the mini-server 603. The mobile client 200 determines if the public query is transmitted through the broker 210 to the mini-server 220 or directly to the mini-server 220. Typically, if the query is simple and will not require a significant amount of time, the mobile client 200 may choose to transmit the query directly to the mini-server 220. Currently, wireless internet connections have a relatively expensive connection time cost, thus more time consuming queries may be more cost effectively handled through the broker.

During normal operation, the web listener 214 of the broker 210 listens for queries from the mobile client 200. Queries may include: a request, device identification, security level and security information. When a query is detected the broker 210 identifies the security level of the query and opens either a secure connection for restricted and private queries or a non-secure (or secure) connection for public queries. The query is transmitted to the broker 210 and the local assistant program 104 obtains the rules from the broker rules 216 required to process the query. The broker 210 transmits public and restricted queries to the mini-server 220. Private queries are stored in the request queue database 218 for later processing by a personal agent 100.

When a public or restricted query is processed, the web listener 222 of the mini-server 220 detects the query from the broker 210 and a connection is opened, secure for a restricted query and non-secure for a public query. The query is transmitted and the local assistant program 104 obtains the rules required to execute the query request from the mobile assistant rules database 226 and these rules are run in the context obtained from data transmitted within the query using the local assistant rule interpreter. Typically the query requires that information obtained by executing the query request be transmitted back to the mobile client 200. Thus, the mini-server 220 obtains the information resulting from the executing the rules and formats the information for optimum display on the PDA according to the rules determined by device information contained in the query. The requested information is transmitted through the broker 210 to the mobile client 200 and displayed in optimum format.

When a private query is processed by the broker, the broker 210 generates a new ticket to uniquely identify the query. The query along with its ticket are stored in the request que database 218. The broker 210 then transmits the ticket information to the mobile client 200 for later retrieval of results. When the personal agent 100 is available, it sends a signal to the broker 210. The personal agent listener 212 detects the signal and the broker 210 opens a secure connection to the personal agent 100. The personal agent 100 transmits its identification and authentication information to the broker 210. The broker 210 searches its request queue database 218 for unprocessed queries matching the identification and passing the authentication check. If such a query is found, it is transmitted to the personal agent 100 along with the associated ticket. If no such query is found a message is transmitted to the personal agent 100 indicating that there are no pending queries.

When the personal agent 100 has retrieved a query from the broker 201 it obtains the rules required to process the query from the local rules database 105. The personal agent 100 performs the query and obtains and formats the requested results suitable for display by the mobile client. The personal agent 100 then signals the broker 210 that results are available. The personal agent listener 212 detects the signal and the broker 210 opens a secure connection to the personal agent 100. The personal agent 100 transmits its identification and authentication information to the broker 210 along with the formatted results and the ticket received with the query and the connection is closed. The broker 210 searches its request queue database 218 for the query identified by the ticket. It checks the provided identification and authentication information provided by the personal agent 100 against the information recorded in the query. If the check succeeds, the formatted results are stored in the query record. If no query is found or if the authentication check fails no action is taken and the reply is ignored. The broker 210 stores the requested private information until the mobile client 200 submits the associated ticket, after which the requested private information is transmitted to the mobile client 200.

In an embodiment, only public queries are transmitted directly from the mobile client 200 to the mini-server 220. The public query may include: a request, a device identification and a security identification indicating that this is a public query. The web server 222 of the mini-server 220 listens for the mobile client query and opens a connection 130 (non-secure or secure) over which the public query is transmitted to the mini-server 605. The local assistant program 104 of the mini-server 220 recognizes the embedded request and device identification information in the query and obtains the associated rules for performing the desired task and formatting the information for the mobile device from the mini-server rules database 226. The mini-server 220 then follows the rules instructions to perform a requested task. If the task includes returning information to the mobile client 200, the mini-server 220 formats the information according device rule to optimize the display on the specific PDA device. The requested information is transmitted back to the mobile client 200 and displayed on the visual display.

In an embodiment, the personal agent 100 can generate a query which is transmitted through the broker 210 to the mini-server 220. The query includes information identifying: the type of request (public or restricted), the mobile client device, and the type of query. If the query is restricted it should also include identification and authorization information. The personal agent 100 transmits a signal to the personal agent listener 212 indicating that query to the broker 210 which opens a secure connection for restricted queries and a non-secure (or secure) connection for public queries. The mini-server 220 obtains the required rules from the mini-server rules database 226 and performs the requested tasks. If information is requested, the mini-server 210 gathers and formats the information according to the rules and transmits the information through the broker 210 back to the personal agent 100.

Rules and functions of the mobile assistant system are updated though the local assistant administrator 110. The updated rules are downloaded to the administrative rules database 114, updated PDA and identification information are downloaded to the administrative database 115 and updated merchant information is downloaded to the merchant database 113. The updated information may be distributed to the personal agent 100, broker 210 and mini-server 220 from the web server 111 of the local assistant administrator 110 through an internet download.

Figure 9:
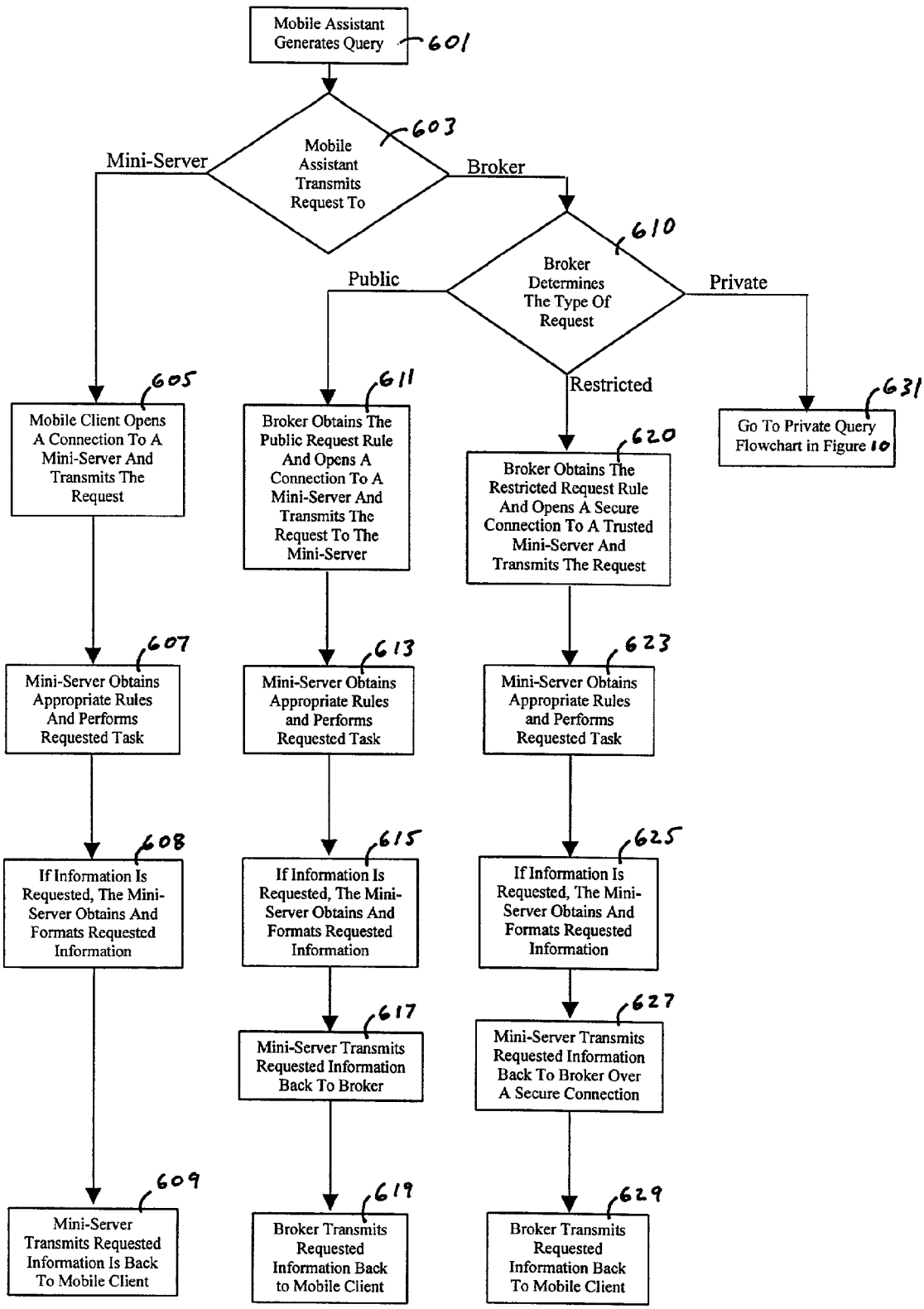
FIG. 9 is a flowchart of the mobile client query processing.
Figure 13:
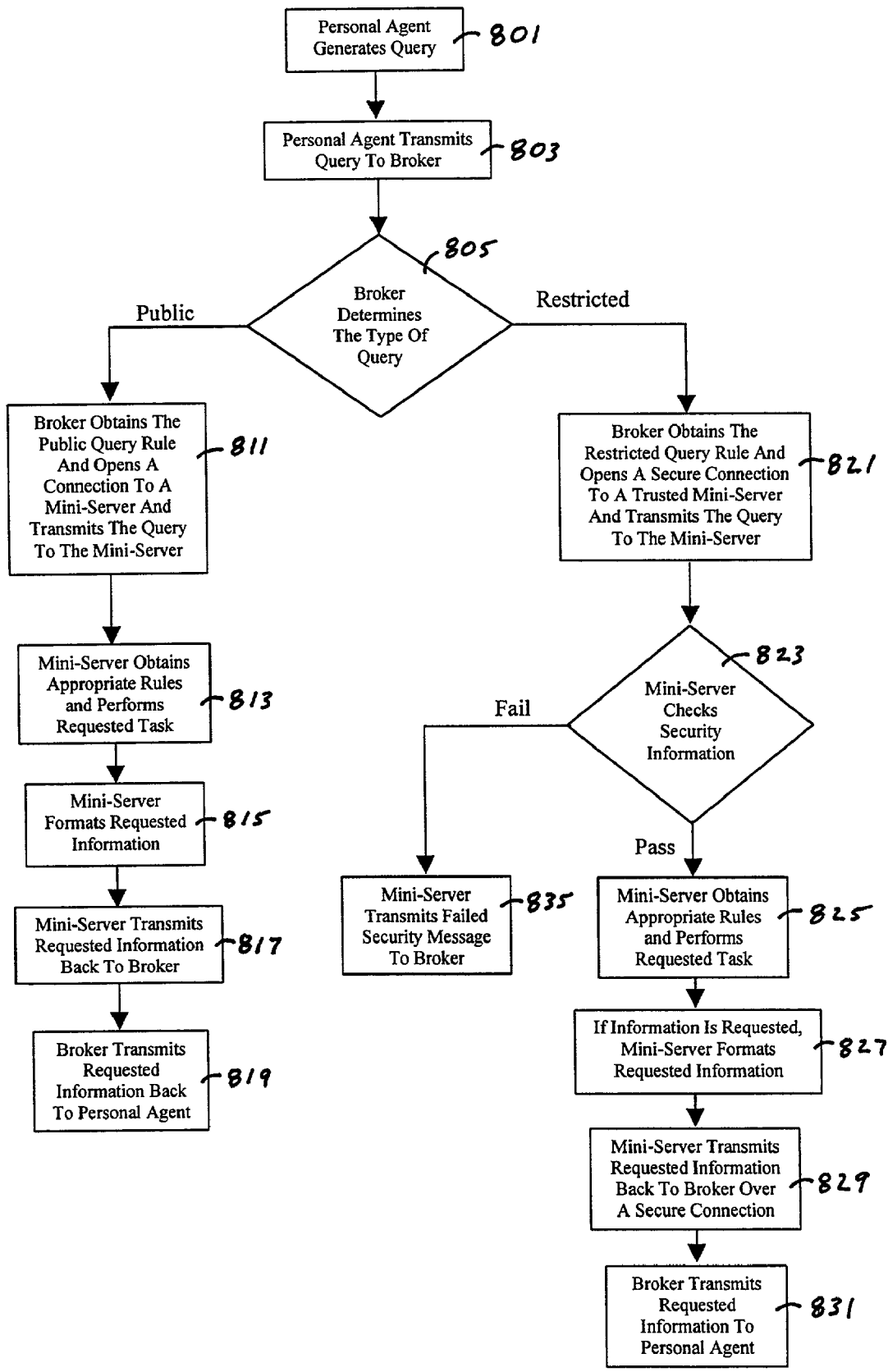
FIG. 13 is a flowchart of the personal agent public or restricted query processing.

FIG. 9 illustrates an exemplary flow chart of the mobile assistant system for mobile client query processing. (A flow chart for queries from the personal agent is shown in FIG. 13.) The mobile client generates a query 601. The query is transmitted to either the mini-server or broker 603. If the query is transmitted to the mini-server a connection between the mini-server and broker is opened and the query is transmitted to the mini-server 605. The mini-server obtains the appropriate rules for the query type and mobile client identification from the mini-server rules database and performs the requested tasks 607. If information is requested, the mini-server obtains and formats the requested information to the PDA requirements 608. If the requested information is not found by the mini-server a message indicating that the requested information was not found may be transmitted to the mobile client. The formatted information is then transmitted back to the mobile client 609, completing the query processing.

When the query is transmitted to the broker, the broker determines the type of query (public, restricted, private) based upon the security information 610. Alternatively, the broker may identify the type of request by the connection made from the mobile client to the broker. If the broker determines that the request is public, the broker obtains the public query rule from the broker rules database, opens a connection (secure or non-secure) to the mini-server and transmits the request to the mini-server 611. The mini-server obtains the appropriate rules for the query type and mobile client identification and performs the requested task 613. If the requested task includes obtaining information, the mini-server formats the requested information 615. The requested information is transmitted from the mini-server back to the broker 617. If the requested information is not found by the mini-server a message indicating that the requested information was not found may be transmitted through the broker to the mobile client. The broker then transmits the requested information or failure message to the mobile client 619.

If the broker determines that the query is restricted 610, the broker opens a secure connection and transmits the restricted request to a trusted mini-server 620. The mini-server obtains the appropriate rules and performs the requested tasks 623. If the requested tasks include obtaining information, the mini-server formats the requested information according to the mobile client device rule 625. The requested information is transmitted back to the broker over a secure connection 627. The broker then transmits the requested information to the mobile client over a secure connection 629. If the broker determines that the query is private 610, the query is processed according to the procedures illustrated in FIG. 10 631.

Figure 10:
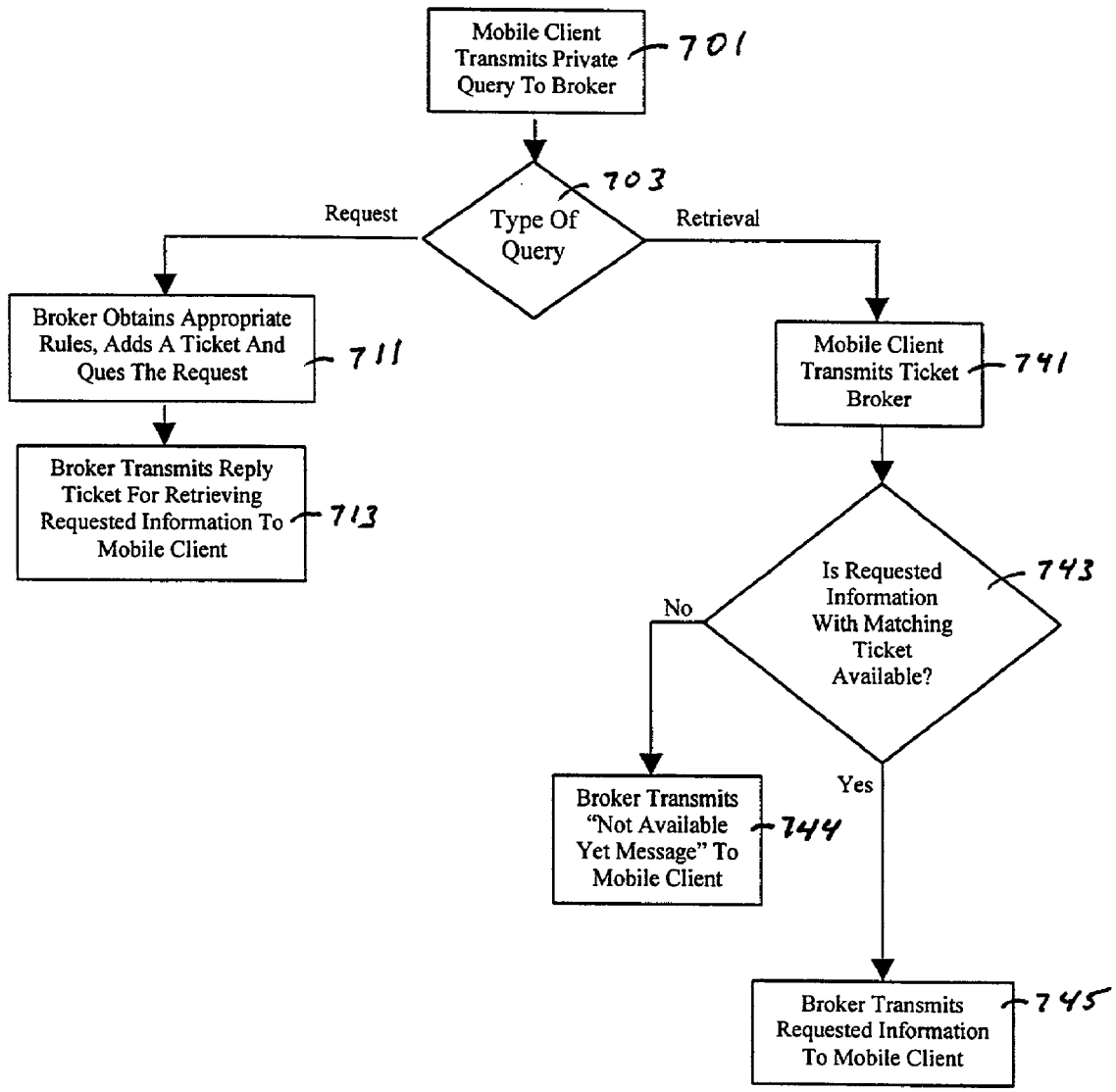
FIG. 10 is a flowchart of the mobile client query que processing.

FIG. 10 is a flow chart illustrating the processing of private queries from the mobile client by the broker. The private query is transmitted from the mobile client to the broker 701. The broker determines if the private query is a request or a retrieval 703. If the query is a private request the broker obtains the appropriate rules, adds a ticket to the query and stores the query in a request que 711. The broker then transmits a response to the mobile client with the ticket information for retrieval at a later time 713. The response to the mobile client may be an HTML document containing the ticket embedded in a URL for retrieving the queued item.

If the private query from the mobile client is a retrieval request, the mobile client transmits the ticket information to the broker 741. The broker then searches its memory for a requested information which has matching ticket information 743. If a matching ticket cannot be found, the broker transmits a "not available yet" message to the mobile client 747 and the user can resubmit the ticket later. The "not available yet" message may be an HTML document containing a try-later URL with the ticket embedded 744. If a matching ticket is found, the requested information is transmitted back to the mobile client 745. Although, the described system only utilizes the ticket system for private queries, it is contemplated that a similar ticket system could be used for public and restricted queries from either a mobile client or the personal agent.

Figure 11:
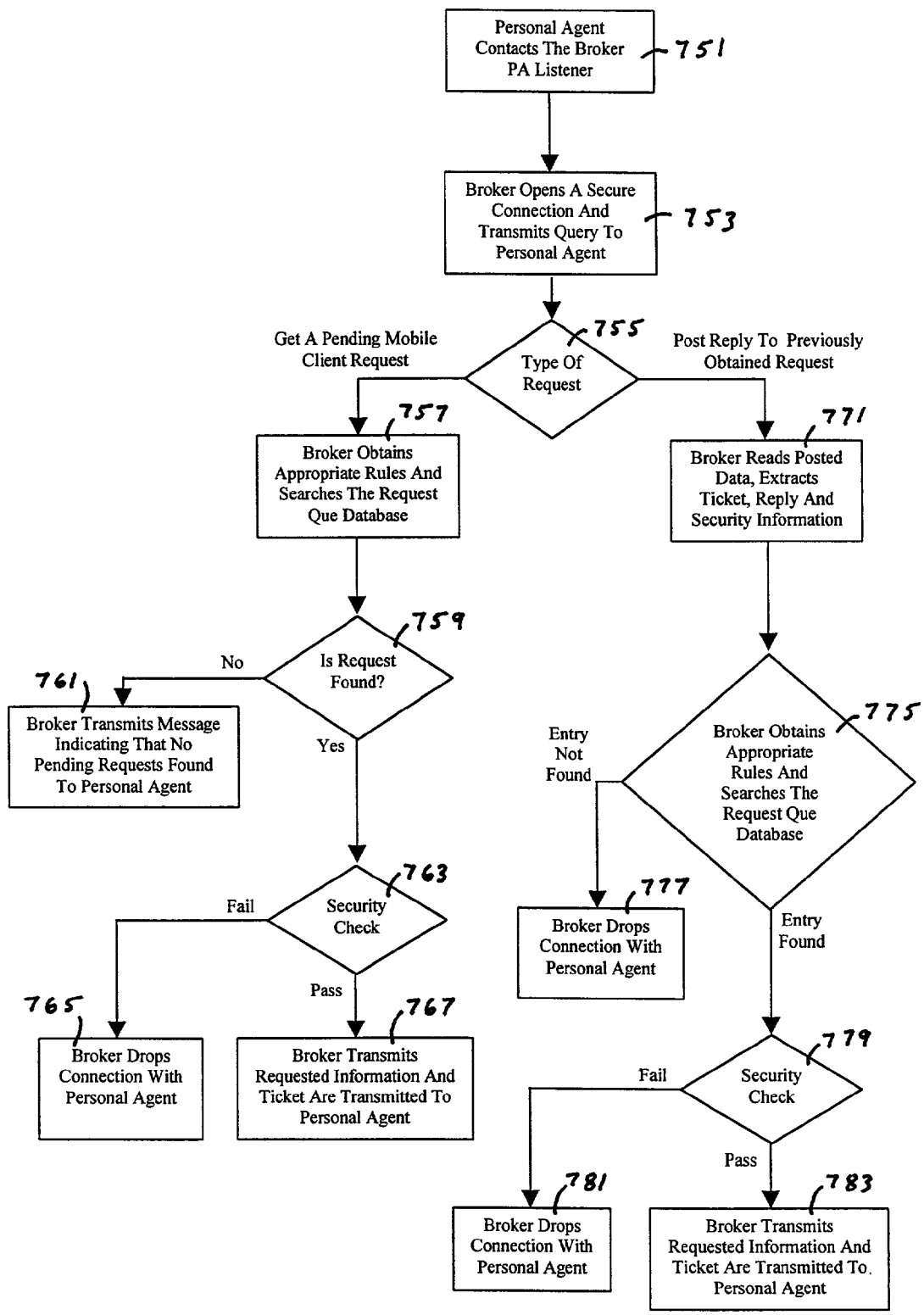
FIG. 11 is a flowchart of the personal agent query posting and retrieval processing.

FIG. 11 is a flow chart illustrating the retrieval and posting of private queries by the personal agent from the broker point of view. The personal agent contacts the broker PA (personal agent) listener 751, the broker opens a secure connection with the personal agent and the agent transmits its request 753. The broker determines whether the personal agent request is to get a pending mobile client request or to post a reply to a previously obtained request 755. If the personal agent request is to get a pending request, the broker obtains the appropriate rules for searching the request que database using the identification and authentication information transmitted by the personal agent as part of its request and searches the request que database 757. The broker determines if the pending request is available 759. If the pending request is not found a message indicating that the pending request was not found may be transmitted to the personal agent 761. If the pending request is found, the security information is checked 763. If the security information is incorrect, the broker may drop the connection with the personal agent 765 or alternatively, a message may be sent to the personal agent indicating that the security information is incorrect. If the security check is passed, the request along with its ticket are transmitted to the personal agent 767.

If the personal agent request is to post a reply, the broker reads the posted data, extracts the ticket, the reply and the personal agent identification and authentication 771. The broker obtains the appropriate rules and executes the rules for posting replies in the context of the extracted data to search for the entry in the request que database with the presented ticket 775. If the entry is found, the identification and authentication are checked 779, and if this succeeds, the reply is posted in the entry 727. If no entry is found the connection between the broker and personal agent is dropped or alternatively a message indicating that an entry was not found is transmitted to the personal agent 777. Similarly, if the entry found but the security check fails, the reply is not posted and the connection between the broker and personal agent is dropped 781.

Figure 12:
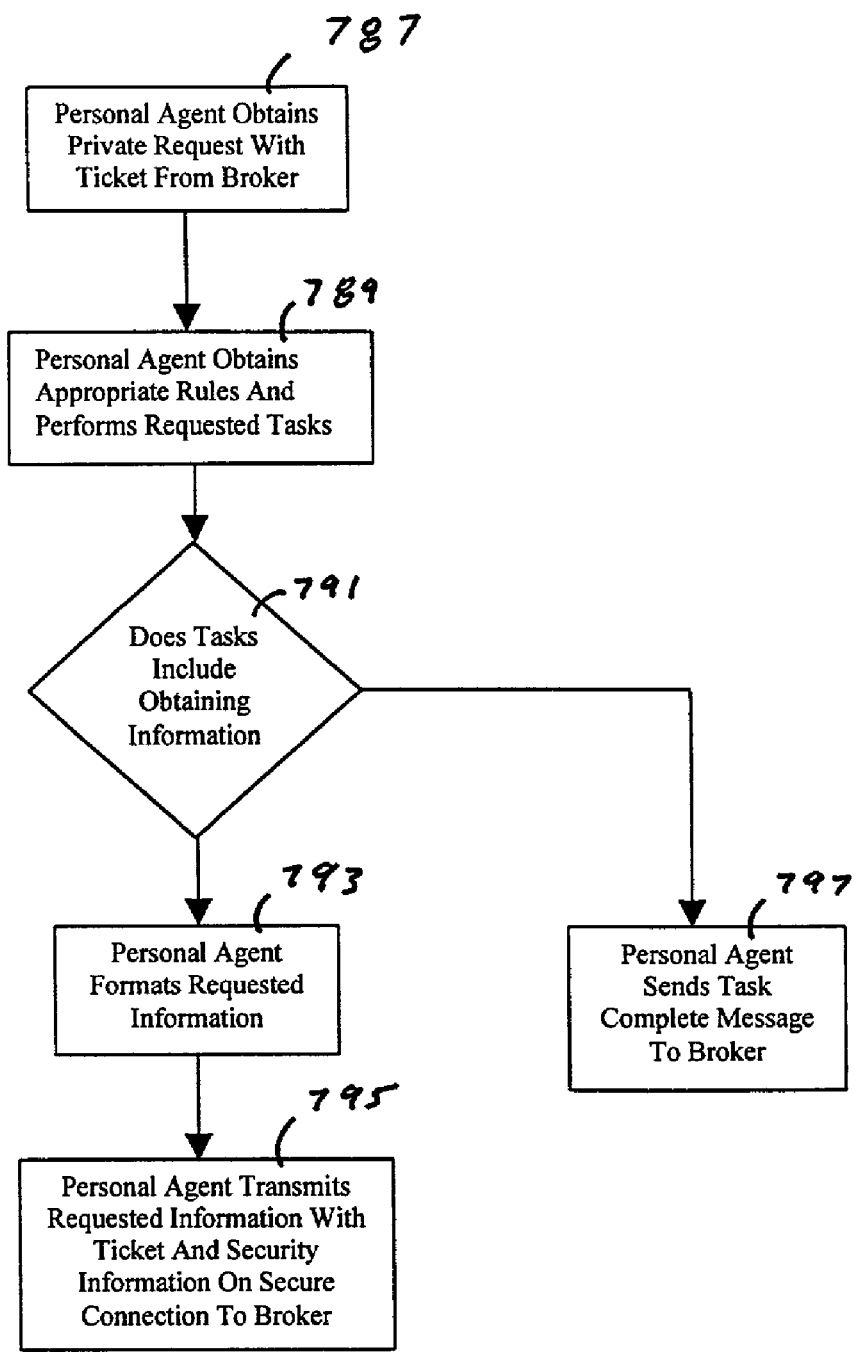
FIG. 12 is a flowchart of the personal agent private query processing.

FIG. 12 is a flow chart illustrating the processing of private queries from the personal agent point of view. The personal agent obtains a private request along with its identifying ticket from the broker 787. The personal agent obtains the appropriate rules from the local rules database and performs the requested tasks 789. The request may include performing specific functions and obtaining requested information. The personal agent determines if the test includes obtaining information 791. If the tasks include obtaining requested information, the personal agent formats the requested information in accordance with formatting rules determined by the mobile client identification 793. The personal agent then transmits the requested information along with the ticket and the personal agents identity and authentication information using a secure connection to the broker 795. If the tasks do not include obtaining information, the personal agent may send a task complete confirmation message to the broker 797.

FIG. 13 is a flowchart of the query processing for queries generated by the personal agent 801. The personal agent may only generate public and restricted queries for a mini-server because it has inherent access to the private information stored on the personal agent. The personal agent transmits the query to the broker 803. The broker determines if the query is public or restricted 805. The distinction may be based upon the security information in the query or alternatively by the type of connection established between the personal agent and the broker. A non-secure connection may indicate that the query is public and a secure connection may indicate that the query is restricted. If the query is public, the broker obtains the public query rules, opens a connection with the mini-server and transmits the query to the mini-server 811. The mini-server obtains the appropriate rules and performs the requests tasks 813. If information is requested, the mini-server formats the requested information according to the requirements of the personal agent 815. The mini-server transmits the requested information to the broker 817 and the broker transmits the requested information to the personal agent 819, completing the query processing.

If the broker determines that the query is restricted 805, the broker obtains the restricted request rule from the broker rules database, opens a secure connection to a trusted mini-server and transmits the query to the mini-server 821. The mini-server obtains the appropriate rules from the mini-server rules database and performs the requested tasks 825. If the requested tasks include obtaining information, the mini-server formats the requested information according to the personal agent format rule 827. The mini-server then transmits the requested information to the broker over a secure connection 829. The broker transmits the requested information back to the personal agent 831 completing the restricted query processing.

As discussed, the local assistant and mobile assistant systems utilize "rules." These rules are used to gather, process, and present data and coordinate the timing of mobile assistant functions. The gathering and processing rules were described with reference to the local assistant system. The presentation rules are to parameterized by the type of receiving device (palmtop, cellular phone, desktop window . . . ), and determine possible data reduction mechanisms, formatting, and the mode of presentation (for example all at once vs. incrementally in blocks). The co-ordinator rules are used to determine what information to gather and when to present the gathered information based on data extracted from a request. The coordinator rules coordinate the invocation of gathering and processing processes. In some situations, a coordinator rule may also utilize auxiliary coordinator rules. A coordinator rule can force gathering and processing rules to be executed sequentially, or it can allow gathering and processing to be execute concurrently. Concurrent gathering and processing may result in requested information being presented incrementally as it is generated.

In an embodiment, a reply to a request is sent in multiple parts. If the reply from the mini-server is long, it may be streamed returning a segment of the requested information plus a link to access the remainder of the requested information. This method may be problematic if the second part of the reply is not accessed within a reasonable period of time because the connection with the mini-server may terminate, thus the link may have a limited period of functionality.

As discussed, queries may fall into three general classes: public, restricted, and private. Public requests are stateless requests for information that use no personalized or private information in the request or the response. Examples include CNET News Headlines, Webster, Weather, and so on. A CNET News request may utilize a news rule which can personalize the information gathered to select the topics of interest to the mobile client at specific synchronization times. Alternatively, the rule may result in the mobile client having a menu of topics to select from. If the information is public, a secure connection is not required during mobile assistant system communications.

A specific example of a public request may be a Palm device asking for CNET science and business news headlines. With reference to FIG. 8, in a first communications path, the mobile client 200 transmits the request directly to the mini-server 220 through internet connection 131. A connection CX 131 may open between mobile client 200 and mini-server 220 and a query may be transmitted to the mini-server 220. The transmitted request may be:

"public?dev=palm&stepname=cnet&topics=science_business"

Each section of the query has a specific meaning: "public?" indicates that the request is public, "dev=palm" indicates that the device is a Palm PDA, "stepname=cnet" indicates that the CNET rule is to be used, and "topics=science_business" indicates that the search topics are science and business. The mini-server 220 interprets the query and obtains the current headline information for science and business from CNET. The mini-server then generates a reply HTML document suitable for the palm PDA and transmits the requested information back through the CX connection 131 to the mobile client 200. After the mobile client 200 receives the requested information, the CX connection 131 may be closed.

The same query can be transmitted to the mini-server 220 through the broker 210. A connection CX 130 is opened between the mobile client 200 and the broker 210 and a query is transmitted to the broker 210. The broker 210 may respond by opening a connection CX' 132 to the mini-server 220 which is associated by the broker with connection CX 130. The mini-server 220 transmits the HTML document (requested information) to the broker 210 over the connection CX' 132 and the broker 210 transmits the HTML document to the mobile client 200 over the CX connection 130. The CX 130 and CX' 132 connections may be closed after the mobile client 200 receives the requested information.

Restricted queries may access and/or modify personal data that resides on an external internet web site. Access to the external site typically requires some security information. For example, a site may require a login procedure which may be a username and password. Examples of restricted request sites include personal accounts at: amazon.com, travelocity.com, and online banking access. For restricted requests, both the request and response should be transmitted over a secure connection(s). We assume that brokers 210 are secure and can be trusted, but for sensitive requests it is also necessary that the mini-server 220 must be one that is trusted and that the connection to the mini-server 220 is secure. A mini-server 220 that has assurances of security may be considered to be "trusted." For additional security, the mobile client 200 directly may directly contact a trusted mini-server 220 through a private connection. In particular the broker 210 and mini-server 220 should be set up to protect any of the personal information transmitted as part of the query or response (requested information). The broker 210 should only keep the personal information for the duration of the transaction and the personal information should only be divulged to authenticated receivers. Such queries may also be handled by a personal agent 100, but the mini-server 220 gives direct responses so the mobile client 200 does not have to wait get a ticket and request the result later.

An example of a restricted request may be an order status request from Amazon.com. The mobile client 200 opens a secure connection SCX 130 to the broker 210 and submits a request:

restricted?dev=palm&stepname=amazonstatus&login =jsmith&passwd=53xyz?!7

Each section of the request is interpreted as follows: "restricted?" means that the request is restricted, "dev=palm" means that the device is a palm PDA, stepname=amazonstatus" means that the query task is checking the status of an order on Amazon, "login=jsmith" later retrieves the requested information from the broker 210. The mobile client 200 submits a query on a secure connection SCX to the broker. The query may be "private?paid=jsmithsagent123&auth=CertData& req=blob."

"private?" means that the request is private, "paid=jsmithagent123" means that the personal agent identifier is jsmithagent123, "auth=CertData" means that the authentication information is CertData and "req=blob" means that the request is "blob" which may be an encoded request. The broker adds identifying ticket information "t" to the query and ques the query information with the ticket (t,jsmithsagent123,CertData,Blob). The broker 210 generates an HTML document containing the ticket information to retrieve the requested information and transmits the HTML document to the mobile client 200 over the secure connection SCX 130.

When the personal agent 100 is available, it opens a secure connection SCX 133 to the broker 210, presents its credentials, and after the credentials are verified, the broker 210 transmits the possibly encoded request and ticket to the personal agent 100 over the secure connection SCX 133 and then closes the connection SCX 133. In an embodiment, if there are repeated failures to pass through the security check for a specific personal agent 100, the broker 210 may inform the mobile client 200 of a potential hacker. The personal agent 100 decode the obtained request and carries out the requested tasks using rules from its local rules database 105 and possibly data from its interaction database 106. It generates an HTML document presenting the requested information according to the mobile client 200 requirements. The personal agent 100 then opens a secure connection SCX 132 to the broker and transmits a reply which may be "posting" with postdata "paid=jsmithsagent123&auth=CertData&ticket=t&ans=html"

means to log in under the name jsmith and "passwd=53xyz?!7" means that the password is 53xyz?!7. The broker 210 responds by opening a secure connection SCX' 132 such as HTTPS to a trusted mini-server 220. The mini-server 220 interprets the request and invokes the rule for retrieving Amazon order status information using the login name and password data from the URL. The mini-server 220 obtains the HTML reply page from Amazon and extracts the desired status information. The mini-server 220 then generates a response HTML document which provides the status information in a format which can be displayed on a Palm device. The response is transmitted from the mini-server 220 to the broker 210 over the SCX' connection and from the broker 210 to the mobile client 200 over the SCX connection 130. After transmitting the response, the SCX 130 and SCX' 132 connections may be closed.

Private requests may involve mobile client 200 access to and modification of personal data on the client's personal agent 100 (desktop computer). Examples include transactions based on stock portfolios, accounting information, or personal schedule items, or in the case of an enterprise application sales information, production information, and schedules stored on the personal agent 100 computer. Private requests may be used to remotely run applications on and manipulate information stored on the personal agent 100. The accessed data on the personal agent 100 can be used to generate data for web transactions.

An example of a private request may be an encripted query from the mobile client 200 which is qued by the broker 210. The broker 210 then transmits the query to the personal agent 200 which decrypts the query, performs the requested tasks and may return requested information which is stored on the broker 210. The mobile client 200 "posting" means that data is being posted to the broker 210, "paid=jsmithagent123" means that the personal agent identifier is jsmithagent123, "auth=CertData" means that the authentication information is CertData, "ticket=t" means that the answer is for the entry with ticket "t", and "ans=html" means that the answer being posted is "html". The broker 210 stores the answer, after checking the agent credentials, until the mobile client 200 submits ticket information matching the ticket "t".

The mobile client 200 retrieves the requested information by transmitting a retrieval request with ticket information to the broker 210 ("retrieve?ticket=t"). If the broker 210 finds an answer match for the ticket, the requested information is transmitted to the mobile client 200. If the broker 210 cannot find a match a message indicating that the requested information is not yet available is transmitted to the mobile client 200.

The individual components of the mobile assistant system are described in more detail below.

1. Mobile Client

The mobile client is a portable device which includes a visual display, input mechanism, memory, microprocessor and mobile internet access. In an embodiment, the mobile client can dynamically generate query time/date information based on information input by the user and information contained it its interaction with the rule databases. In another embodiment, a more sophisticated mobile-client may also run a (reduced version of) the local assistant client-side kernel.

2. Broker

A broker is a computer system running the local assistant program. A broker is an intermediate facilitator of the mobile assistant system. The broker monitors query activity from both mobile-clients and personal agents and may use different ports for the two classes of requests. Alternatively, the broker distinguishes the mobile client queries from personal agent queries by request type.

In an embodiment, the broker is similar to a message center which accepts messages from a mobile-client, passes them on to the client's personal agent, accepts returned messages from personal agents, and passes the personal agent responses on to the mobile-client. In both cases messages are passed on only when requested, either by the mobile-client or the personal agent. The information transmitted is visible only to the mobile-client and the agent. The broker's authentication checks must ensure that only the expected personal agent gets access to information in a private request, and can generate replies, assuming that the mobile-client and its agent provide adequately secure authentication data. The user of the mobile-client is responsible for insuring that the personal agent is secure and that the mobile client and personal agent share an adequate secret to support the desired degree of security (authenticity and secrecy).

The broker stores interaction data including information about public mini-servers, private requests and timeout parameters for tickets in memory. The stored mini-server information includes a listing of the mini-servers which includes contact information such as URLs and may also include status (trusted). The information stored for each private request may include: the unique id (ticket), a timestamp indicating the creation time, associated personal agent and authentication data, the query body which may be encrypted, the query response and a timestamp for the response (if the query has been processed by the personal agent) and any other suitable information. The timeout parameters for tickets are the conditions under which a query response is discarded from the broker memory, for example if a specific amount of time has elapsed.

3. Mini Server

A public min-server is a computer system running the Local Assistant program. A public mini-server, registers its willingness to respond to mobile assistant requests with a broker either offline or by a specific protocol. A registered mini-server listens for mobile-client and personal agent queries, and is capable of setting up either plain non-secure or secure connections. These queries may come directly from the mobile-client or through a broker. A query specifies a query type, a request for information including a rule stored on the mini-server to invoke and any data needed by the rule, and a specific type of mobile device being used. The underlying local assistant client side kernel applies the rules corresponding to the query parameters. The public mini-server may not keep personal interaction data but may temporarily cache auxiliary information related to a request, and include queries to access that information in the response (probably via direct access). For example stories associated to headlines can be cached for later retrieval, or large text streams could be streamed by constructing continuation URLs.

4. Personal Agent

A personal agent includes a local assistant client side system running on a Personal Computer (PC) associated with mobile-client. In addition to standard local assistant rule-sets, the personal agent may have rules for periodically requesting jobs from a broker. Rules on the personal agent system allow access the information needed for identification and authentication which is kept in the (personal) interaction database. The personal agent has access to personal data and can thus carry out web transactions on behalf of its user (the mobile client), either through a direct query or at predetermined times or intervals specified by the user. In an embodiment, the personal agent keeps a record of replies for mobile requests, so they can be resent or retrieved locally at a later time.

Because private information is stored on the personal agent, security and configurability may be of primary importance when integrating the personal agent into the mobile assistant system. It may be necessary to only connect to trusted brokers and trusted mini-servers as well. In an embodiment, the broker and personal agent may also have their own (proprietary) interaction protocol that runs on top of a secure connection. In another embodiment the broker and personal agent use standard secure network protocols such as HTTPS. The mobile-client device shares a secret with its synchronizing desktop computer (personal agent), which is presumed to be protected by the user(s) of both components. If the secret or mobile client is lost, the broker may have a revocation mechanism to prevent use of compromised secrets for authentication. The overall security of the mobile assistant system is the combination of secure connections and authentication of the mobile-client/personal agent relationship when messages are transmitted from one to the other.

C. Rules

The broker, public mini-server, and personal agent use rules to implement their actions. The broker has specific rules for dispatching queries. The public mini-server and the personal agent have rules for parsing the query data, creating associated tasks, processing queries, formatting and writing request results to a specified output stream. The broker, public mini-server, and personal agent also have rules for getting rule-set updates from their local assistant administrative server. The personal agent has rules for retrieving requests from a broker, and for generating mobile-client applications with personalized queries.

In the foregoing, mobile assistant system for providing information to a mobile device has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for providing information to mobile devices comprising the steps:

providing a mobile device having a visual display, a broker and a personal agent computer having a personal agent database, wherein the mobile device, the broker and the mini-server are each separate computers:

transmitting a query which include identification information to the broker;

transmitting the query to the personal agent computer;

processing the query according to rules obtained from the personal agent database;

obtaining requested information;

formatting the requested information for the visual display of the mobile device;

transmitting the requested information to the mobile device;

displaying at least a portion of the requested information on the visual display of the mobile device;

attaching a ticket to the request;

storing the request in the request que of the broker; and transmitting retrieval information from the broker to the mobile device;

wherein the transmitting the requested information to the mobile device step is only performed if the mobile device transmits the retrieval information to the broker.

2. The method for providing information to mobile devices of claim 1 wherein the query includes security information and the transmitting steps made are over secure connections if required by the security information.

3. The method for providing information to a mobile device of claim 1 further comprising the steps:

transmitting the query from the broker to a mini-server;

processing the query according to rules from the mini-server ruleset; and obtaining requested information and returning said information to the broker.

4. The method for providing information to mobile devices of claim 1 further comprising the steps: transmitting retrieval information to the mobile device, and transmitting the requested information to the mobile device if the retrieval information is transmitted to the broker.

5. A method for providing information to a mobile device comprising the steps:

providing a mobile device having a visual display, a broker and a personal agent computer having a personal agent rule set, wherein the mobile device, the broker and the personal agent computer are each separate computers;

transmitting a query which is initiated by the mobile device and includes identification information to the broker;

transmitting the query from the broker to the personal agent computer, upon request of the personal agent computer, wherein the request contains identifying information to be matched to the identification information in the query;

processing of the query by the personal agent computer according to rules contained in the personal agent rule set;

transmitting the resulting requested information from the personal agent computer to the broker;

formatting the requested information for the visual display of the mobile device;

transmitting the requested information from the broker to the mobile device when initiated by the mobile device; and displaying at least a portion of the requested information that has been specially formatted on the visual display of the mobile device;

attaching a ticket to the query;

storing the query with the ticket in a request que of the broker;

transmitting the retrieval information from the broker to the mobile device;

transmitting the query and the ticket that is attached to the query from the broker to the personal agent computer if the personal agent computer is authenticated by matching identification information;

providing the ticket along with resulting information from the personal agent to the broker; and storing the resulting information associated with the ticket by the broker; wherein the transmitting of the request information to the mobile device step is only performed if the mobile device transmits the retrieval information to the broker.

6. The method for providing information to mobile devices of claim 5 wherein the query includes security information and the transmitting steps made are over secure connections if required by the security information.

7. The method for providing information to a mobile device of claim 5 further comprising the steps:

transmitting the query from the broker to a mini-server;

processing the query according to rules from the mini-server ruleset; and obtaining requested information and returning said information to the broker.

8. The method for providing information to mobile devices of claim 5 further comprising the steps:

transmitting retrieval information to the mobile device; and transmitting the requested information to the mobile device if the retrieval information is transmitted to the broker.

* * * * *

UNITED STATES PATENT AND TRADEMARK OFFICE
CERTIFICATE OF CORRECTION

PATENT NO. : 7,035,828 B2  Page 1 of 3
APPLICATION NO. : 10/082495
DATED : April 25, 2006
INVENTOR(S) : Ketonen et al.

It is certified that error appears in the above-identified patent and that said Letters Patent is hereby corrected as shown below:

Col 10, line 67, after "are" insert -- displayed, and updates to the local and administrative interaction databases are made (events G-I[M]), FIG. 4c shows a screen shot of the information produced when a customer was listening to a Paul Simon recording. The information includes a an album offer (from Amazon) and links to a review, concert information, and a news group article.

7. News Notification Application

FIGS. 5a-5b illustrate the flow of information and sequence of events when a Local Assistant News Assistant application operates on a Customer computer 100. In such an application, a News assistant ruleset contains a task to be executed periodically. This task retrieves a news summary document from the News Assisted Merchant's site. As an example, the following is a rule that retrieves current news from cnet.com:

<PE>
<CatId>StepInfo</CatId>
<Key>getcnet</Key>
<feature>cnet.xml</feature>
<steptype>task</steptype>
<repeattime>15</repeattime>
<feature>cnet.xml</feature>
<Do>
   <set>cnetfound "false"</set>
   <getpage>
   "http://news.cnet.com/"--

Col 20, line 54, after "login=jsimith" insert --means to log in under the name jsmith and "paswd=53xyz?!7" means that the password is 53xyz?!7. The broker 210 responds by opening a secure connection SCX' 132 such as HTTPS to a trusted mini-server 220. The mini-server 220 interprets the request and invokes the rule for retrieving Amazon order status information using the login name and password data from the URL. The mini-server 220 obtains the HTML reply page from Amazon and extracts the desired status information. The mini-server 220 then generates a response HTML document which provides the status information in a format which can be displayed on a Palm device. The response is transmitted from the min-server 220 to the broker 210 over the SCX' connection and from the broker 210 to the mobile client 200 over the SCX connection 130. After transmitting the response, the SCX 130 and SCX' 132 connections may be closed.

UNITED STATES PATENT AND TRADEMARK OFFICE
CERTIFICATE OF CORRECTION

PATENT NO.       : 7,035,828 B2
APPLICATION NO.  : 10/082495
DATED            : April 25, 2006
INVENTOR(S)      : Ketonen et al.

It is certified that error appears in the above-identified patent and that said Letters Patent is hereby corrected as shown below:

Con't

Private requests may involve mobile client 200 access to and modification of personal data on the client's personal agent 100 (desktop computer). Examples include transactions based on stock portfolios, accounting information, or personal schedule items, or in the case of an enterprise application sales information, production information, and schedules stored on the personal agent 100 computer. Private requests may be used to remotely run applications on and manipulate information stored on the personal agent 100. The accessed data on the personal agent 100 can be used to generate data for web transactions.
    An example of a private request may be an encripted query from the mobile client 200 which is queued by the broker 210. The broker 210 then transmits the query to the personal agent 200 which decrypts the query, performs the requested tasks and may return requested information which is stored on the broker 210. The mobile client 200 --

Col 21, line 24, delete "means to log in under the name jsmith and "paswd=53xyz?!7" means that the password is 53xyz?!7. The broker 210 responds by opening a secure connection SCX' 132 such as HTTPS to a trusted mini-server 220. The mini-server 220 interprets the request and invokes the rule for retrieving Amazon order status information using the login name and password data from the URL. The mini-server 220 obtains the HTML reply page from Amazon and extracts the desired status information. The mini-server 220 then generates a response HTML document which provides the status information in a format which can be displayed on a Palm device. The response is trasmitted from the min-server 220 to the broker 210 over the SCX' connection and from the broker 210 to the mobile client 200 over the SCX connection 130. After transmitting the response, the SCX 130 and SCX' 132 connections may be closed.
    Private requests may involve mobile client 200 access to and modification of personal data on the client's personal agent 100 (desktop computer). Examples include transactions based on stock portfolios, accounting information, or personal schedule items, or in the case of an enterprise application sales information, production information, and schedules stored on the personal agent 100 computer. Private requests may be used to remotely run applications on and manipulate information stored on the personal agent 100. The accessed data on the personal agent 100 can be used to generate data for web transactions.

UNITED STATES PATENT AND TRADEMARK OFFICE
CERTIFICATE OF CORRECTION

| | |
|---|---|
| PATENT NO. | : 7,035,828 B2 |
| APPLICATION NO. | : 10/082495 |
| DATED | : April 25, 2006 |
| INVENTOR(S) | : Ketonen et al. |

It is certified that error appears in the above-identified patent and that said Letters Patent is hereby corrected as shown below:

Con't

An example of a private request may be an encripted query from the mobile client 200 which is qued by the broker 210. The broker 210 then transmits the query to the personal agent 200 which decrypts the query, performs the requested tasks and may return requested information which is stored on the broker 210. The mobile client 200"

Signed and Sealed this

Twenty-eighth Day of July, 2009

JOHN DOLL
*Acting Director of the United States Patent and Trademark Office*